(12) United States Patent
Kaneko et al.

(10) Patent No.: US 11,610,317 B2
(45) Date of Patent: Mar. 21, 2023

(54) IMAGE PROCESSOR AND IMAGE PROCESSING METHOD

(71) Applicant: Faurecia Clarion Electronics Co., Ltd., Saitama (JP)

(72) Inventors: Takayuki Kaneko, Saitama (JP); Shunsuke Kondo, Saitama (JP); Mamoru Kubota, Sagamihara (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 22 days.

(21) Appl. No.: 17/168,874

(22) Filed: Feb. 5, 2021

(65) Prior Publication Data

US 2021/0248753 A1    Aug. 12, 2021

(30) Foreign Application Priority Data

Feb. 6, 2020  (JP) .............................. JP2020-018480
Feb. 21, 2020  (JP) .............................. JP2020-027982

(51) Int. Cl.
*G06T 7/13* (2017.01)
*G06T 7/181* (2017.01)

(52) U.S. Cl.
CPC ................ *G06T 7/13* (2017.01); *G06T 7/181* (2017.01); *G06T 2207/30242* (2013.01); *G06T 2207/30256* (2013.01)

(58) Field of Classification Search
CPC ........ G06V 20/588; G06T 2207/30256; G06T 2207/30264
See application file for complete search history.

(56) References Cited

U.S. PATENT DOCUMENTS

| 2002/0039443 | A1 | 4/2002 | Sakamoto |
| 2007/0084655 | A1 | 4/2007 | Kakinami et al. |
| 2011/0019000 | A1 | 1/2011 | Sakamoto |
| 2014/0244070 | A1 | 8/2014 | Inagaki et al. |
| 2015/0125039 | A1* | 5/2015 | Wu .................. G06V 10/44 382/104 |
| 2015/0194057 | A1 | 7/2015 | Jin |
| 2015/0356359 | A1* | 12/2015 | Kawasaki ............ G06V 10/143 382/104 |

(Continued)

FOREIGN PATENT DOCUMENTS

CN       101978392     2/2011
EP       3 594 852     1/2020

(Continued)

OTHER PUBLICATIONS

Extended European Search Report dated Jul. 14, 2021 in European Patent Application No. 21155274.0.

(Continued)

*Primary Examiner* — Amandeep Saini
*Assistant Examiner* — Raphael Schwartz
(74) *Attorney, Agent, or Firm* — Wenderoth, Lind & Ponack, L.L.P.

(57) ABSTRACT

An image processor includes an imaging device that captures an image of a road surface around a vehicle V, and a control portion that detects a marker drawn on the road surface from the captured image. The control portion connects a plurality of broken markers to create a single marker when the detected marker is broken into plural.

11 Claims, 19 Drawing Sheets

(56) References Cited

U.S. PATENT DOCUMENTS

| | | |
|---|---|---|
| 2018/0189577 A1 | 7/2018 | Yoo et al. |
| 2018/0189578 A1* | 7/2018 | Yang ...................... G01C 21/32 |
| 2019/0188497 A1 | 6/2019 | Kawano et al. |
| 2019/0266418 A1 | 8/2019 | Xu et al. |
| 2019/0384294 A1 | 12/2019 | Shashua et al. |
| 2020/0020104 A1* | 1/2020 | Mittal ...................... G06T 7/13 |

FOREIGN PATENT DOCUMENTS

| | | |
|---|---|---|
| JP | 3-99952 | 4/1991 |
| JP | 8-167023 | 6/1996 |
| JP | 2003-118522 | 4/2003 |
| JP | 2007-179386 | 7/2007 |
| JP | 2014-166834 | 9/2014 |

OTHER PUBLICATIONS

Office Action dated Oct. 19, 2022 in CN Patent Application No. 202110097136.9.

* cited by examiner

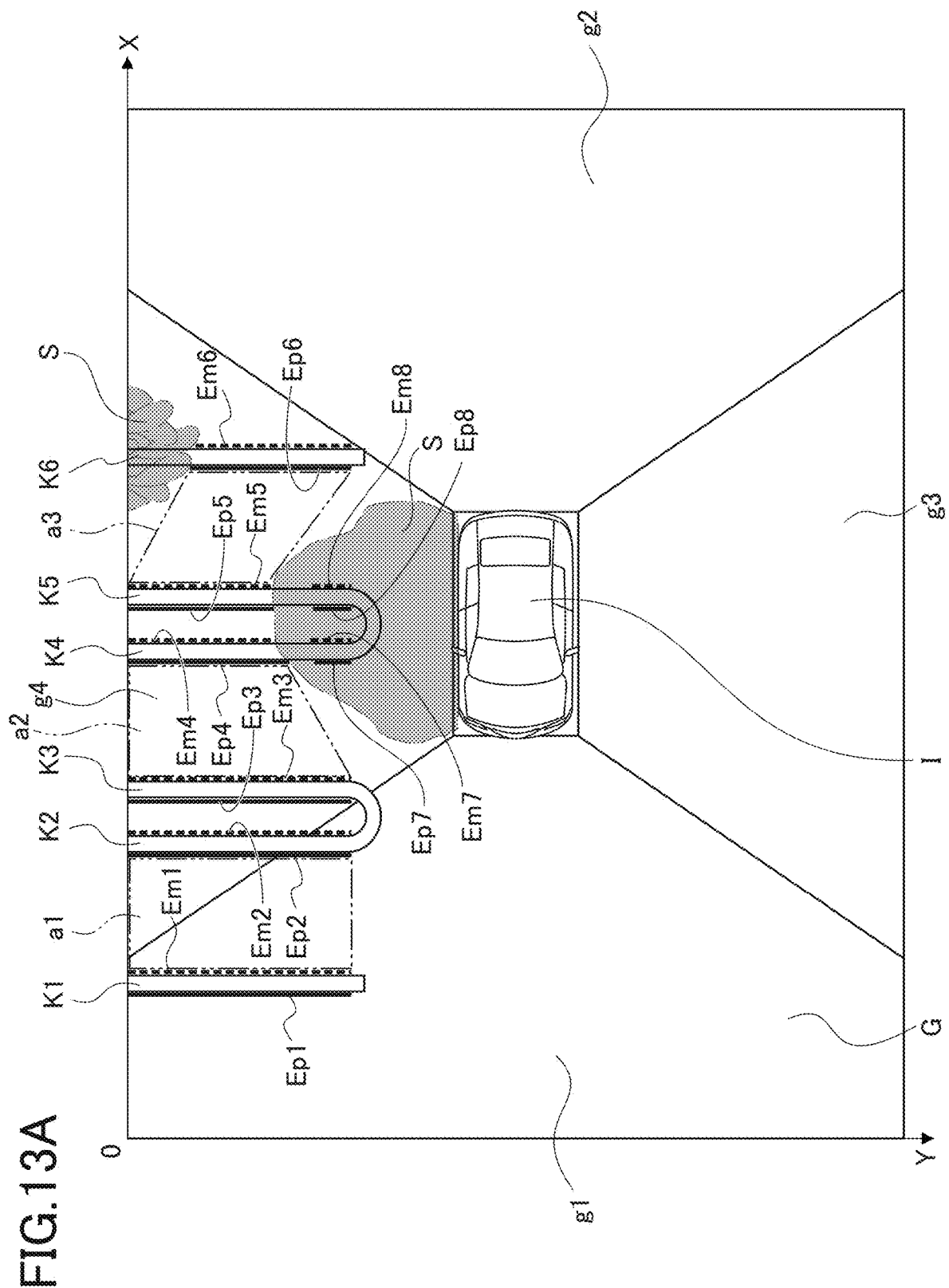

WHEN INTERRUPTED
BY SHADOW OR LIGHT

WHEN INTERRUPTED BY SHADOW OR LIGHT

IMAGE PROCESSOR AND IMAGE PROCESSING METHOD

CROSS-REFERENCE TO RELATED APPLICATION

The present application is based on and claims a priority benefit of Japanese patent application No. 2020-018480, filed on Feb. 6, 2020, and a priority benefit of Japanese patent application No. 2020-027982, filed on Feb. 21, 2020, the disclosures of which are hereby incorporated herein by reference in their entireties.

BACKGROUND

This disclosure relates to an image processor and an image processing method.

A parking assistance apparatus configured to automatically detect a parking space (parking frame) as a parking target and to automatically park a vehicle at the detected parking space has been in practical use (e.g., JP2014-166834A). The apparatus of JP2014-166834A is configured to detect a parking area line from an image captured by an imaging device and to recognize an area defined by a pair of the detected parking area lines as a target parking position (i.e., as parking frame). Additionally, a drive assistance apparatus configured to automatically detect a lane borderline that divides a traveling lane based on an image around the vehicle captured while traveling and to automatically drive the vehicle has also been in practical use.

In order to detect a white line such as the parking area line and/or the lane borderline, a white line detection apparatus and a white line detection method configured to detect an edge from an image around the vehicle and to detect a white line based on the detected edge has been taught by, for example, JP1996-167023A or JP2007-179386A.

SUMMARY

With the conventional apparatuses and methods, it is difficult to accurately detect a parking area line or the like due to a relatively large shadow of the subject vehicle, another vehicle, a wall, a fence, etc., and/or shadows of leaves of trees, and/or reflection of light by road lighting, etc., and/or a blur, and/or an obstacle. In particular, the brightness and the brightness difference of a parking area line are different between an area with shade and an area without shade, thereby it is difficult to properly detect the edge of the parking area line with shade. Therefore, it has been desired to develop a technology capable of suppressing false detection and/or non-detection of edge so as to improve the detection accuracy of a parking area line and the detection accuracy of a parking space and/or a traveling lane.

An object of the present disclosure is, therefore, to provide an image processor and an image processing method capable of detecting a maker drawn on a road surface such as a parking area line and a lane borderline with high accuracy.

To achieve the above object, an embodiment of an image processor of the present disclosure comprise a control portion configured to detect a marker drawn on a road surface from an image captured by an imaging device that captures the road surface around a vehicle. The control portion connects a plurality of broken markers to create a single marker when the detected marker is broken into plural.

Additionally, an embodiment of an image processing method of the present disclosure comprises detecting a marker drawn on a road surface from an image captured by an imaging device that captures the road surface around a vehicle, and image-processing to connect a plurality of broken markers to create a single marker when the detected marker is broken into plural.

BRIEF DESCRIPTION OF DRAWINGS

FIG. 13A is a view for explaining an example of an operation of the image processor according to the second embodiment, and the view schematically illustrates an overhead image, an edge detected from the overhead image, and a parking frame.

DETAILED DESCRIPTION

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

First Embodiment

Hereinafter, a first embodiment of the present disclosure will be described with reference to the drawings. The following description is made based on a parking assistance apparatus. However, the image processor and the image processing method of the first embodiment as well as the image processor and the image processing method of the second embodiment are applicable to a driving assistance apparatus that assists the driving of a vehicle traveling in a traveling lane, and the like.

Figure 1:
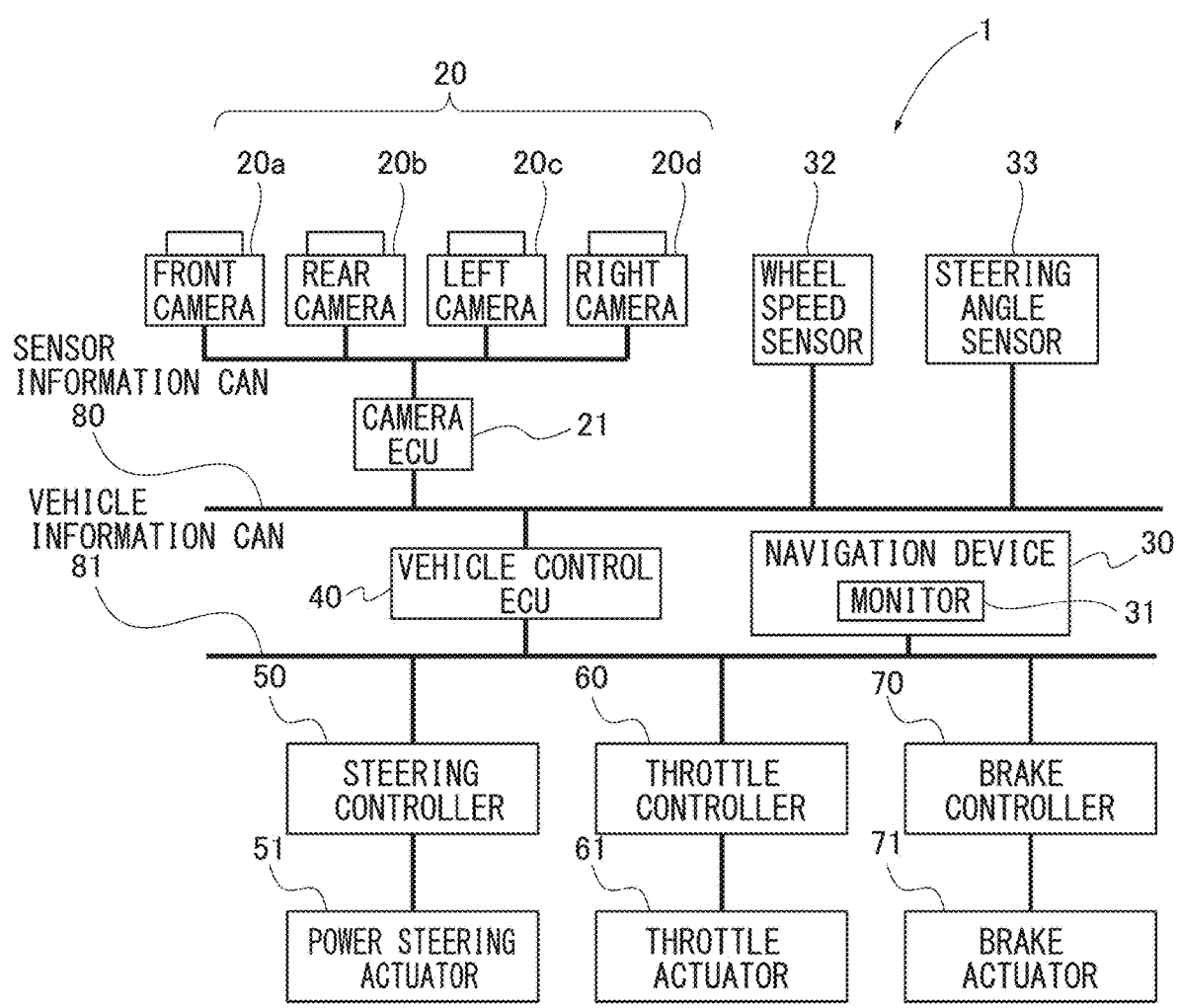
FIG. 1 is a block diagram illustrating a schematic configuration of a parking assistance apparatus to which an image processor according to a first embodiment of the present disclosure is applied.

As illustrated in FIG. 1, a vehicle V (refer to FIG. 2) is equipped with a parking assistance apparatus 1 that performs a parking assist operation. More specifically, the parking assistance apparatus 1 recognizes a parking frame in which the vehicle V can be parked. The parking assistance apparatus 1 controls the vehicle V such that the vehicle V is parked in the recognized parking frame.

Figure 2:
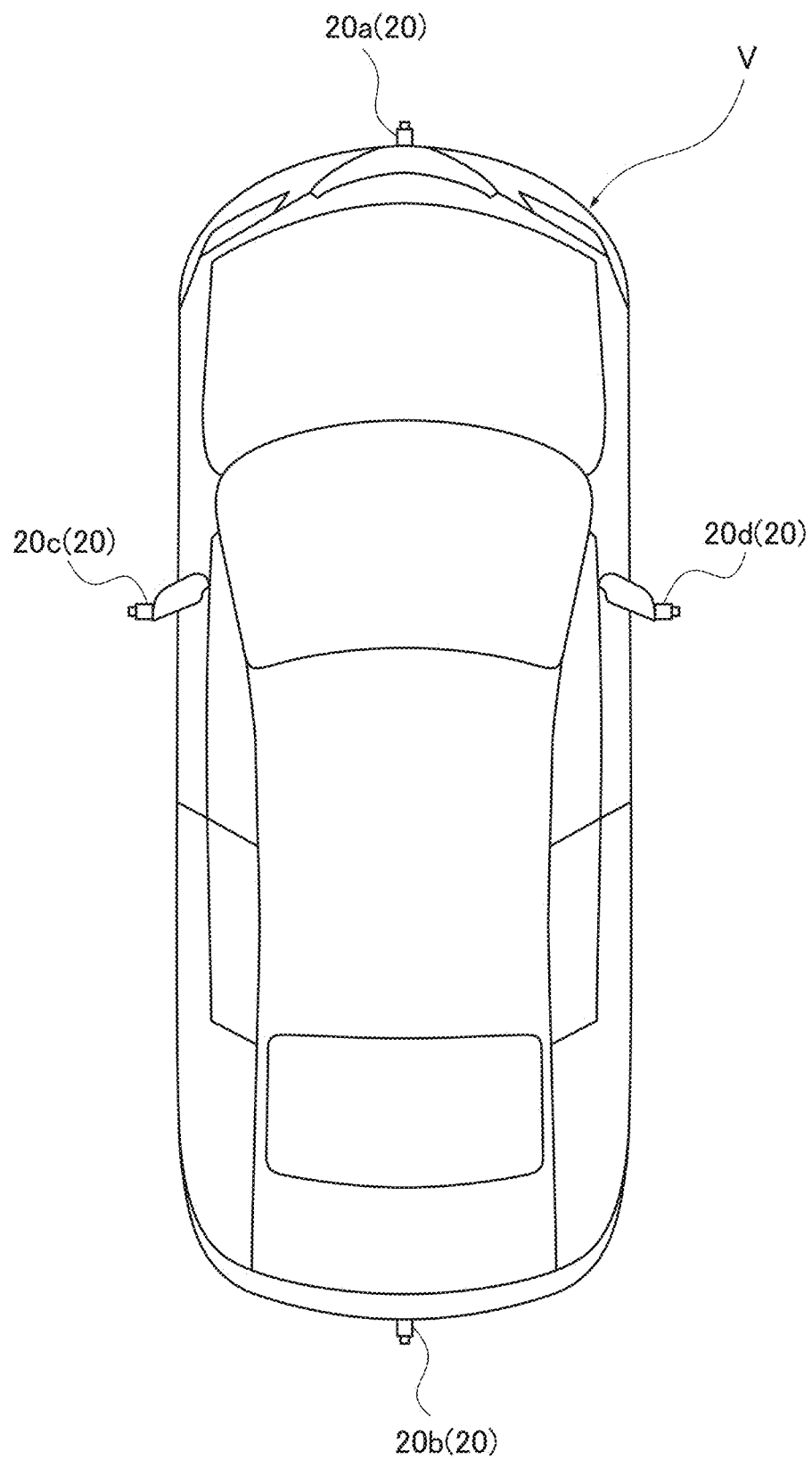
FIG. 2 is a view illustrating an example of arrangement position of imaging devices of the parking assistance device according to the first embodiment.

A plurality of small cameras (imaging devices) are mounted on front and rear portions and right and left portions of the vehicle V, as illustrated in FIG. 2.

Specifically, a front camera 20a facing the front of the vehicle V is mounted on a front bumper or a front grille of the vehicle V. A rear camera 20b facing the rear of the vehicle V is mounted on a rear bumper or a rear garnish of the vehicle V. A left camera 20c facing the left side of the vehicle V is mounted on a left door mirror of the vehicle V. A right camera 20d facing the right side of the vehicle V is mounted on a right door mirror of the vehicle V.

Each of the front camera 20a, the rear camera 20b, the left camera 20c, and the right camera 20d is equipped with a wide-angle lens or a fisheye lens capable of observing a wide range. A region around the vehicle V (i.e., in this embodiment, a region including a road surface R around the vehicle V) can be completely observed by the four cameras 20a to 20d. The cameras 20a to 20d constitute the imaging device that images the road surface R around the vehicle V. In the following description, the respective cameras (imaging device) 20a to 20d may be simply referred to as cameras 20 without distinguishing the respective cameras 20a to 20d.

Referring back to FIG. 1, the parking assistance apparatus 1 includes the front camera 20a, the rear camera 20b, the left camera 20c, the right camera 20d, a camera ECU 21, a navigation device 30, a wheel speed sensor 32, and a steering angle sensor 33.

The camera ECU 21 includes a microcomputer, as a main body, having a Central Processing Unit (CPU), a Read Only Memory (ROM), a Random Access Memory (RAM), and a flash memory. The camera ECU 21 controls the cameras 20 and performs a creation process of creating an overhead image, a detection process of detecting a parking frame, and a determination process of determining whether or not the vehicle V can be parked in the detected parking frame by using information detected by the cameras 20.

The navigation device (display device) 30 includes a monitor 31 having an image display function. The navigation device 30 includes a memory in which, for example, map data for guiding a route is stored. The navigation device 30 guides a route to a destination set by an operator of the navigation device 30 based on the map data and a present position of the vehicle V detected by a GPS device (not shown), for example. Various images during a route guidance operation are displayed on the monitor 31.

The wheel speed sensor 32 detects a wheel speed of the vehicle V. The information (wheel speed) detected by the wheel speed sensor 32 is input to a vehicle control ECU 40.

The steering angle sensor 33 detects a steering angle of the vehicle V. The steering angle sensor 33 outputs a rotation angle from a neutral position (0 degree) as the steering angle. The steering angle when the vehicle V travels straight is set as the neutral position (0 degree). The information (steering angle) detected by the steering angle sensor 33 is input to the vehicle control ECU 40.

The parking assistance apparatus 1 includes the vehicle control ECU 40, a steering controller 50, a throttle controller 60, and a brake controller 70.

The vehicle control ECU 40 includes a microcomputer, as a main body, having a Central Processing Unit (CPU), a Read Only Memory (ROM), a Random Access Memory (RAM), and a flush memory. The vehicle control ECU 40 executes various processes that assist the parking of the vehicle V based on the various information input from the camera ECU 21, the wheel speed sensor 32, and the steering angle sensor 33.

That is, when a driver starts the parking assistance apparatus 1 by turning on an automatic parking start switch (not shown), for example, the vehicle control ECU 40 executes an automatic parking process of automatically parking the vehicle V in a parking frame determined as an available parking frame by the camera ECU 21.

The steering controller 50 controls the steering angle of the vehicle V by driving a power steering actuator 51 based on the vehicle control information determined by the vehicle control ECU 40.

The throttle controller 60 controls the throttle of the vehicle V by driving a throttle actuator 61 based on the vehicle control information determined by the vehicle control ECU 40.

The brake controller 70 controls the brake of the vehicle V by driving a brake actuator 71 based on the vehicle control information determined by the vehicle control ECU 40.

The camera ECU 21, the wheel speed sensor 32, the steering angle sensor 33, and the vehicle control ECU 40 are connected by a sensor information Controller Area Network (CAN) (registered trademark) 80 which is an interior Local Area Network (LAN).

The steering controller 50, the throttle controller 60, the brake controller 70, and the vehicle control ECU 40 are connected by a vehicle information CAN (registered trademark) 81 which is the interior LAN.

In the parking assistance apparatus 1 with the above configuration, an image processor 100 of the embodiment is mainly constituted by the camera ECU 21.

Figure 3:
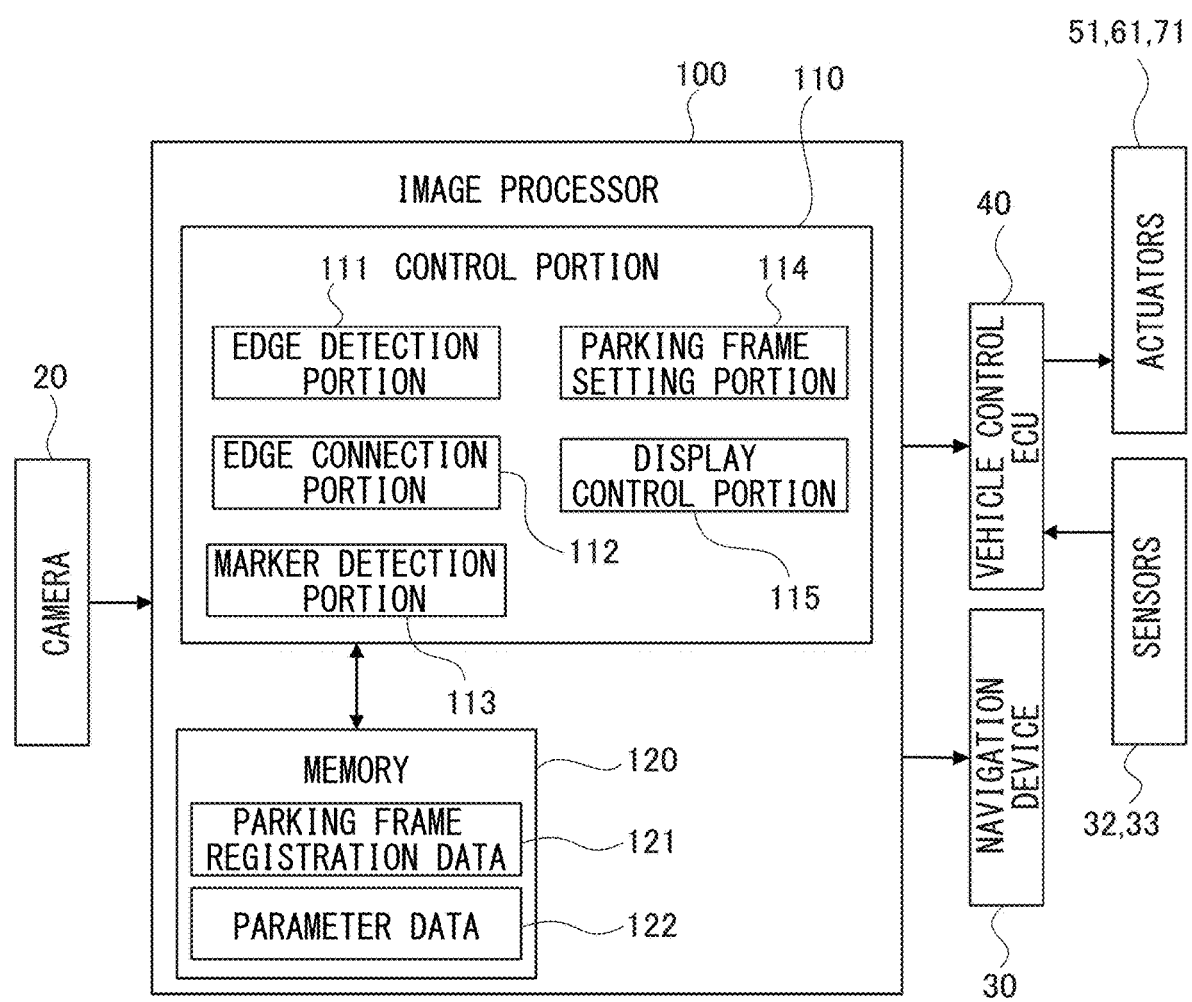
FIG. 3 is a functional block diagram illustrating a schematic configuration of the image processor of the first embodiment.

As shown in FIG. 3, the image processor 100 of the first embodiment includes a control portion 110 and a memory 120. The control portion 110 is mainly constituted by the CPU of the camera ECU 21, and the memory 120 is mainly constituted by the ROM, the RAM, the flash memory, and the like of the camera ECU 21.

The control portion 110 controls the entire image processor 100. In addition, the control portion 110 sends information (e.g., position and shape of parking space and/or parking lot) necessary for the automatic parking process to the vehicle control ECU 40. The vehicle control ECU 40 executes the automatic parking process to automatically park the vehicle V at an available parking frame based on a parking space or parking area lines defining the parking space. The parking area lines are detected and defined by an edge detection portion 111, an edge connection portion 112, a marker detection portion 113, and a parking frame setting portion 114.

The vehicle control ECU 40 controls the power steering actuator 51, the throttle actuator 61, and the brake actuator 71 (simply recited as actuators in FIG. 3) based on the information provided from the control portion 110 and the information detected by the wheel speed sensor 32 and the steering angle sensor 33 (simply recited as sensors in FIG. 3).

The control portion 110 includes a calculation element represented by an integrated circuit such as a programmable logic device and an ASIC. The programmable logic device includes a CPU and an FPGA.

A control program is stored in the memory 120 of the image processor 100. This control program is executed by the control portion 110 at the startup of the image processor 100. The image processor 100 includes a functional configuration as illustrated in FIG. 3. In particular, as the image processor 100 executes an after-described high speed image process, it is preferable for the image processor 100 to have a calculation element capable of calculating at high speed, for example, an FPGA.

Figure 17:
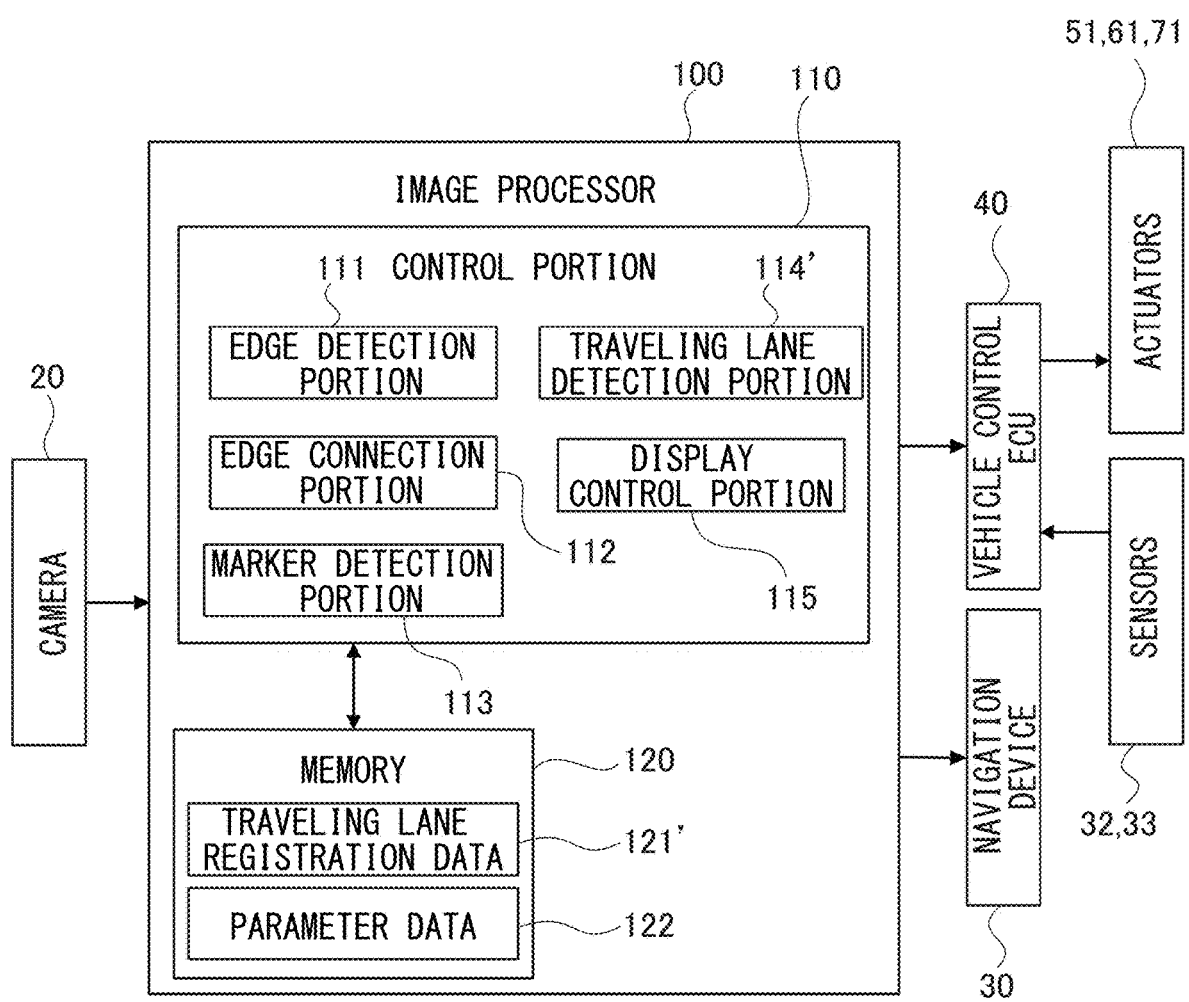
FIG. 17 is a functional block diagram illustrating a schematic configuration of a variation of the image processor of a first embodiment.

As illustrated in FIG. 3, the control portion 110 includes the edge detection portion 111, the edge connection portion 112, the marker detection portion 113, the parking frame setting portion 114, and a display control portion 115. When the image processor 100 or the image processing method is applied to a drive assistance apparatus or a drive assistance method, a traveling lane detection portion 114' (see FIG. 17) is provided thereto instead of the parking frame setting portion 114.

Figure 5:
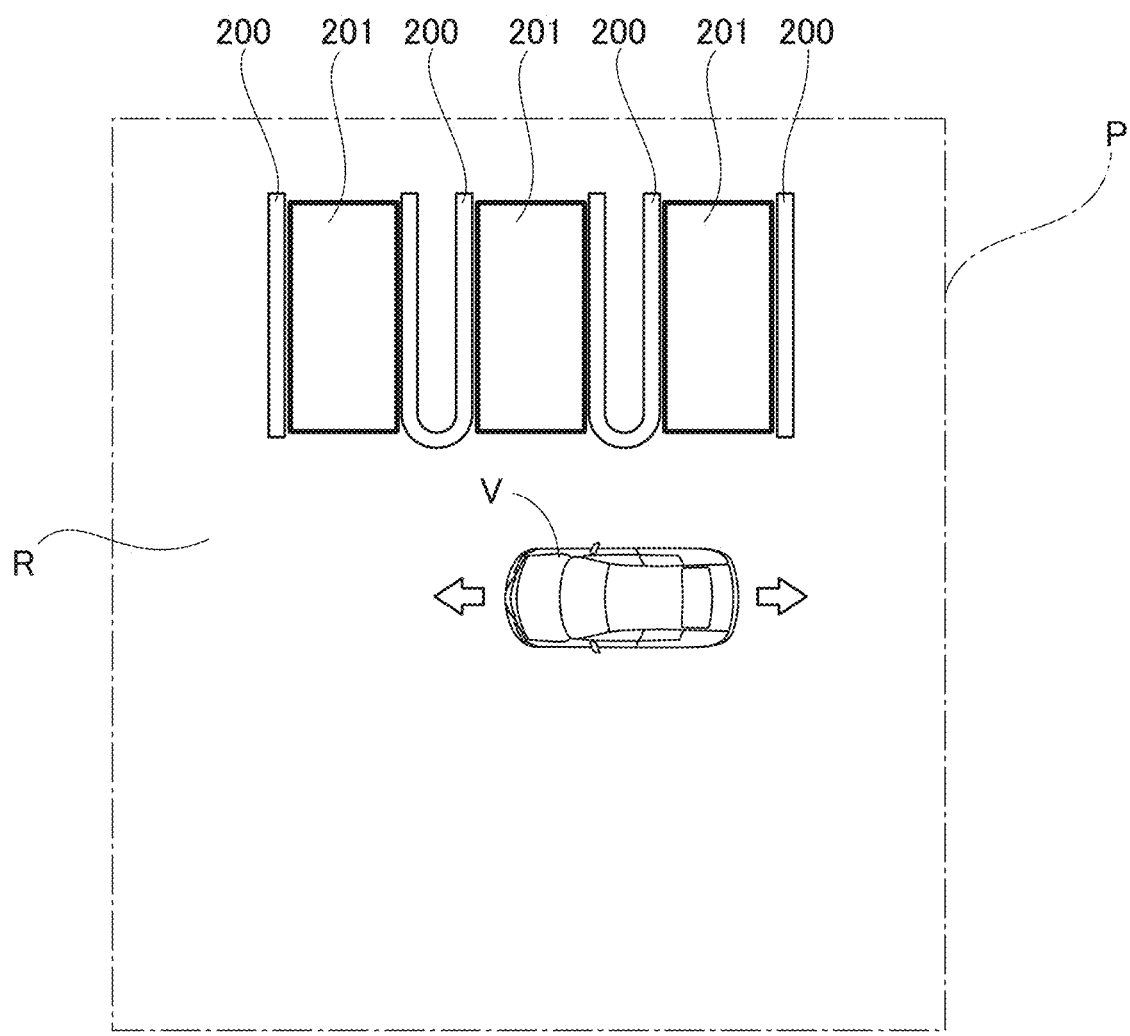
FIG. 5 is a view for explaining an example of an operation of the image processor according to the first embodiment, in which a vehicle and a parking area line drawn on a road surface in a parking lot are illustrated.

The edge detection portion 111 detects an edge of a parking area line 200 as a marker on a road surface R of a parking lot P, for example, by edge detection based on the image signal output from the camera 20 that images the road surface R around the vehicle V. When applied to a drive assistance apparatus, the edge detection portion 111 detects a marker such as a traveling lane borderline on a road surface. The parking area line is a borderline (straight line) that divides a parking region (parking space) provided mainly on the road surface R. FIG. 5 illustrates one example of the vehicle V and the parking area lines 200 drawn on the road surface R of the parking lot P for the vehicle V to be parked. A parking frame 201 representing a parking region is provided between the parking area lines 200.

The lane borderline is drawn as a borderline that divides a traveling lane (driving lane) provided mainly on the road surface, and is an uninterrupted solid line (straight line or curved line) or a broken line (straight line or curved line) in which a plurality of line segments with a specified length continues. It should be noted that the marker is not limited to a parking area line or a lane borderline. For example, diagonal lines representing a non-parking area, pedestrian crossings, wheelchair marks, and the like are also listed as the marker.

The parking area line is generally drawn by a white line but may be drawn by a colored line other than a white line, for example, a yellow line. The parking area line detected by the edge detection portion 111 is not limited to the white line, and a borderline having a contrast with respect to a road surface is generally detected as the parking area line.

The edge detection portion 111 scans the image in a predetermined direction to detect a pixel at which a brightness value or a color parameter (for example, RGB, RGBA) contained in the image signal changes more than a threshold value (prescribed value) with respect to an adjacent pixel, and detects a portion in which the detected pixel array has a predetermined length or more as an edge. The scanning described herein is meant to select a pixel one by one in the predetermined direction and to compare the brightness or the color parameter between the adjacent pixels. The detected edge is referred to as a positive edge or a negative edge according to a direction (trend) of a change in the color parameter or the brightness.

It is preferable for the scanning direction to be set to the direction orthogonal to the parking area line drawn on the road surface R. More specifically, as illustrated in FIG. 5, when the parking area line 200 extends in the direction orthogonal to the traveling direction (refer to arrow in FIG. 5) of the vehicle V, it is preferable to scan in the traveling direction on the overhead image G (refer to FIG. 6A, for example). On the other hand, when the parking area line 200 extends in the traveling direction of the vehicle V, it is preferable to scan in the direction orthogonal to the traveling direction on the overhead image G. As the direction in which the parking area line 200 extends is generally unknown, it is desirable for the edge detection portion 111 to scan twice in both of the traveling direction of the vehicle V and the direction orthogonal to the traveling direction on the overhead image G.

To detect an edge based on brightness values, the edge detection portion 111 determines, as the positive edge, that an edge at which the pixel changes from a dark pixel with low brightness (e.g., black pixel) to a bright pixel with high brightness (e.g., white pixel) with a difference greater than the threshold value (prescribed value). In particular, the edge detection portion 111 determines that an edge having a brightness difference from an adjacent pixel greater than the prescribed value in the positive direction as the positive edge (may also referred to as "rising edge"). Detecting such a positive edge may mean that the scanning position has changed from the road surface R to the parking area line 200.

Additionally, the edge detection portion 111 determines, as the negative edge, that an edge at which the pixel changes from a bright pixel with high brightness to a dark pixel with low brightness with a difference greater than the threshold value (prescribed value). In particular, the edge detection portion 111 determines that an edge having a brightness difference from an adjacent pixel greater than the prescribed value in the negative direction as the negative edge (may also referred to as "falling edge"). Detecting such a negative edge may mean that the scanning position has changed from the parking area line 200 to the road surface R.

On the other hand, in order to detect the edge based on the color parameter, the color parameter of the road surface R and the color parameter of the parking area line are compared. The edge detection portion 111 detects the pixel array in which the value of the color parameter is changed in the increase direction (changed in negative direction) as the negative edge and the pixel array in which the value of the color parameter is changed in the decrease direction (changed in positive direction) as the positive edge. When the brightness of the parking area line is lower than that of the road surface (or color parameter is larger), the changes in the brightness value and the color parameter are reversed. In any case, the positive edge and the negative edge are detected on the both sides of the borderline such as the parking area line, which makes later-described pair extraction possible.

By repeating the above scanning for a plurality of lines, a line segment (pixel array) constituted by the consecutive positive edges in the direction crossing the scanning direction is detected as the positive edge line segment. Further, a line segment (pixel array) constituted by the consecutive negative edges is detected as the negative edge line segment.

Figure 6A:
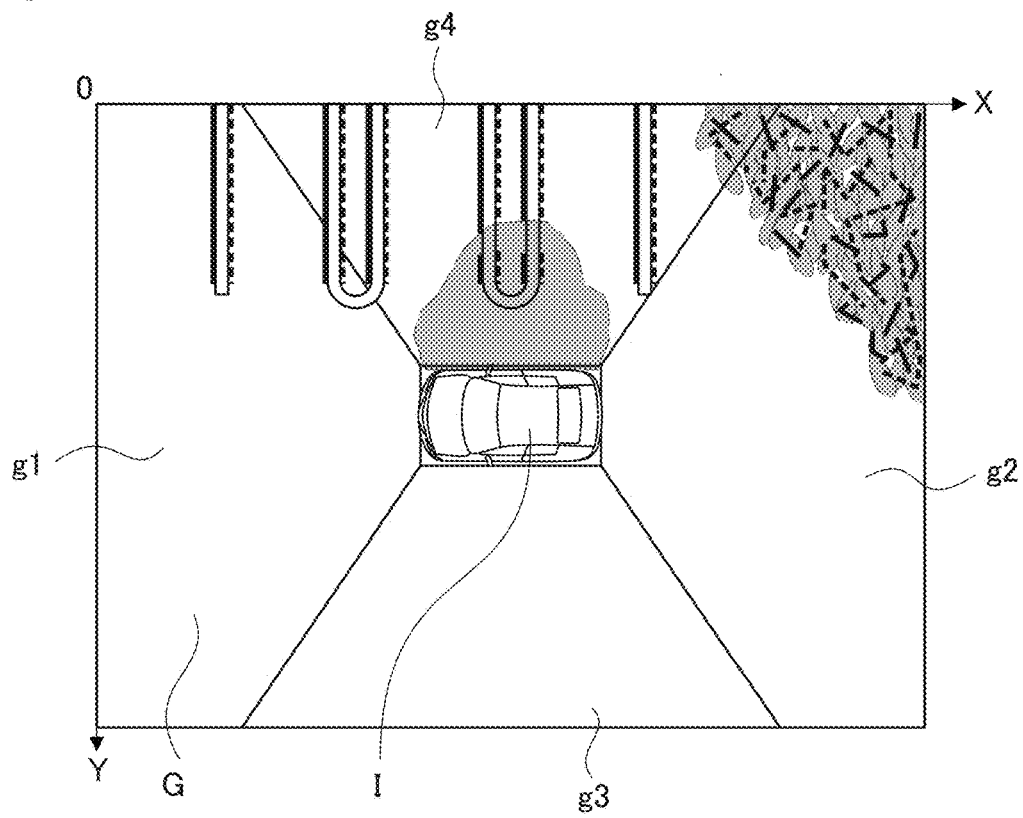
FIG. 6A is a view for explaining an example of an operation of the image processor according to the first embodiment, and the view schematically illustrates an overhead image and the edge detected from the overhead image.

FIG. 6A schematically shows an overhead image G and edges detected from the overhead image G with thick solid lines and thick dashed lines. In FIG. 6A, an X-axis of the overhead image G is in the left and right direction of the drawing (i.e., direction along traveling direction of vehicle V and direction orthogonal to extending direction of parking area line 200), and a Y-axis thereof is the vertical direction of the drawing (i.e., extending direction of parking area line 200). The edge detection portion 111 scans the overhead image G from the left side to the right side of the drawing (i.e., in X-axis positive direction) to detect a positive edge and a negative edge therefrom. If the edge detection portion 111 scans the image from the right side to the left side of the drawing (i.e., in X-axis negative direction), the positive edge and the negative edge are reversed. It should be noted that the positive edge and the negative edge may be detected based on a color parameter of the image signal. In such a case, the edges are detected in accordance with a change in the gradation of a prescribed color.

As shown in FIG. 6A, when a large shadow such as a shadow of the vehicle V overlaps the parking area line 200, a part of the edge of parking area line may be interrupted in the vicinity of the boundary between the road surface R and the shadow in the overhead image G. This is because the brightness of the road surface R without shade and the brightness of the road surface R with shade are different from each other, as well as the brightness of the parking area line with shade and the brightness of the parking area line without shade are different from each other.

The brightness differences between the parking area line and the road surface, and/or the edge angles (directions) may be different between the area without shade and the area with shade. Thus, the edges in the area without shade and the edges in the area with shade may be detected as separate edges. Additionally, the edges in the vicinity of a boundary between the area without shade and the area with shade may not be detected. As a result, the detected edge of the parking area line may be broken, and therefore, it may deteriorate the detection accuracy of a parking frame. Similarly, when a part of the parking area line is illuminated by road lights or headlights strongly, the brightness difference between the road surface and the parking area line in the image changes or highlight clipping may occur, and thus the similar issue may be found.

In order to prevent the deterioration of detection accuracy under such circumferences, the edge connection portion 112 of this embodiment is configured to connect the broken edges. To be specific, the edge connection portion 112 of this embodiment respectively detects an edge (hereinafter, may referred to as "closest edge") closest to each of the plurality of edges (which may also be referred to as "subject edge") detected by the edge detection portion 111. The edge connection portion 112 then detects the subject edge and the closest edge as a pair of edges that are candidate to be connected. Here, the subject edge is selected one by one from the plurality of edges detected by the edge detection portion 111 and is used as a subject to detect other edges present within a predetermined range.

When the distance between the subject edge and the closest edge is a predetermined interval or shorter, the edge connection portion 112 connects the paired two edges (i.e., subject edge and closest edge) to create a single edge (hereinafter, may also be referred to as "connected edge"). The edge connection portion 112 also scans the area between the endpoint of the subject edge and the endpoint of the closest edge in an extending direction of the subject edge and determines whether or not information related to a marker (e.g., parking area line) is present between the subject edge and the closest edge. When it is determined that information related to the marker is present therebetween, the edge connection portion 112 connects the subject edge and the closest edge. When it is determined that information related to the marker is not present therebetween, the edge connection portion 112 does not connect the subject edge and the closest edge.

The operation of the edge connection portion 112 of this embodiment will be described in detail. In this specification, an endpoint of each edge line segment detected first (i.e., endpoint closer to the origin of Y coordinate) is referred to as a "start point", and an endpoint of each edge line segment detected later (i.e., endpoint far from the origin of Y coordinate) is referred to as a "finish point".

The procedure for detecting the closest edge will be described with reference to FIG. 7A and FIG. 7B. As shown in FIGS. 6A and 7B, a plurality of edges (noises) may be densely detected due to shadows of leaves of trees or the like. If these edges (noises) are connected, a line other than the parking area line may be detected as a parking area line, resulting in a deterioration of detection efficiency and detection accuracy.

To prevent such an issue, the edge connection portion 112 is configured to, for each of the plurality of edges (i.e. for each of subject edges), count a number of edges present within the predetermined range from the subject edge. When the number of counts is a threshold number or greater, the edge connection portion 112 does not connect the subject edge to other edges.

Figure 7A:
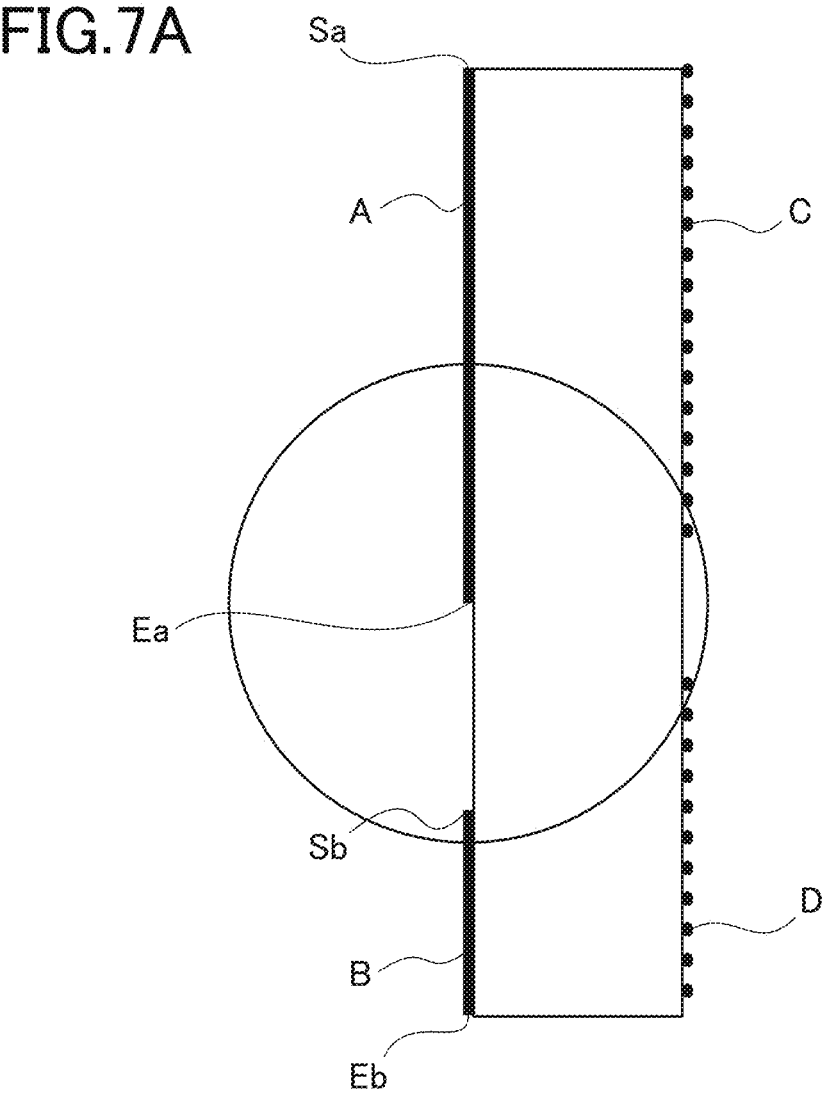
FIG. 7A is a view for explaining an example of an operation of the image processor according to the first embodiment, and the view illustrates an edge broken or interrupted by a shadow.
Figure 7B:
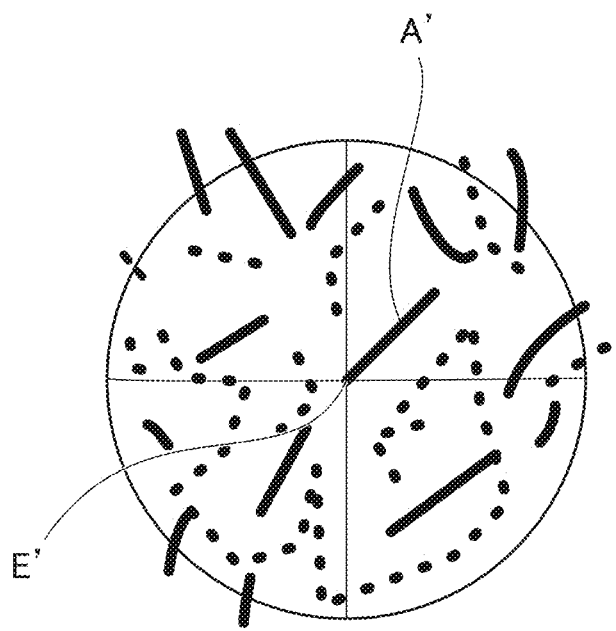
FIG. 7B is a view for explaining an example of an operation of the image processor according to the first embodiment, and the view illustrates an edge detected due to shadows of leaves of trees.

For example, in FIG. 7A, the edge connection portion 112 searches other positive edges within the predetermined range from the finish point Ea of the positive edge line segment A (within a circle drawn in FIG. 7A), and detects the positive edge line segment B. In this example, the number of counts is one (1) and is less than the threshold number, thereby the positive edge line segment A and the positive edge line segment B are assigned as the pair of the candidates to be connected. If a plurality of edge line segments are detected (but less than the threshold number), the edge line segment B closest to the positive edge line segment A is assigned as the candidate to be connected.

When a plurality of edges due to the noises caused by shadows of a building, leaves of trees, or the like are detected, the edge connection portion 112 finds multiple edges within the predetermined range from the finish point E' of the positive edge line segment A', as shown in FIG. 7B. In this example, the number of counts is the threshold number or greater, and the edge connection portion 112 thus determines that the subject edge line segment A' itself is also a noise and does not connect the edge line segment A' with other edges. As a result, the edges caused by noises are not connected unexpectedly and are removed by the following filtering process, thereby improving the marker detection efficiency and detection accuracy.

Figure 8A:
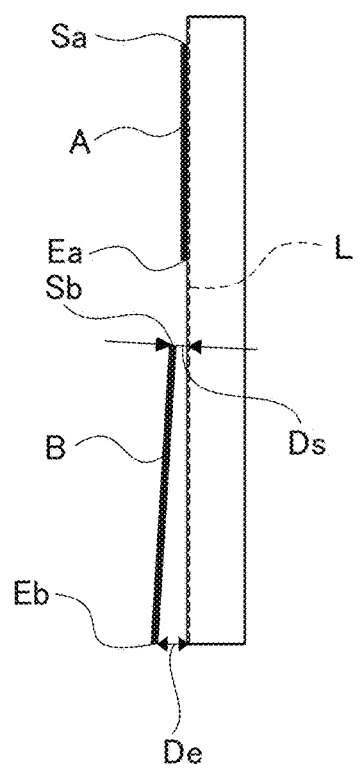
FIG. 8A is a view for explaining an example of an operation of the image processor according to the first embodiment, and the view schematically illustrates an edge A and an edge B detected within a predetermined range.

The edge connection portion 112 further calculates a distance from the endpoint of the subject edge line segment A to the start point and to the finish point of each of the edge line segments B present within the predetermined range. The calculation process will be described with reference to FIG. 8A. FIG. 8A shows a schematic view of the line segment A of the subject edge (hereinafter, referred to as "edge A") and the line segment B of the edge detected within the predetermined range (hereinafter, referred to as "edge B"). The start point and the finish point of the edge A are denoted by Sa and Ea, and the start point and the finish point of the edge B are denoted by Sb and Eb.

The edge connection portion 112 calculates a formular for a straight-line L including the edge A (straight line formed by extending edge A), and calculates a distance Ds from the straight-line L to the start point Sb of the edge B and a distance De from the straight-line L to the finish point Eb of the edge B based on the calculated formula and the positional coordinate of the start point Sb and finish point Eb of the edge B on the image. The edge connection portion 112 then determines whether or not the distances Ds, De are a predetermined distance (threshold value) or shorter. When it is determined that the distances exceed the predetermined distance, it is considered that the edge B may be noise and thus the edge B is discarded. The above calculation and determination processes are carried out for all edges detected with respect to the subject edge A.

When there are edges B with the distances Ds, De equal to or shorter than the predetermined distance, the edge B closest to the subject edge A among these edges B is selected as the closest edge and is assigned as the candidate to be connected to the edge A.

Next, the scanning process between the opposing endpoints of the edge A and the edge B (closest edge) having the shortest distance from the edge A will be described with reference to FIG. 8B.

The edge connection portion 112 scans between the finish point Ea of the edge A and the start point Sb of the edge B by a predetermined length in a direction that intersects with the extending direction of the edge A and the edge B. The "predetermined length" herein may be the width of the parking area line (or the corresponding numbers of pixels)+a predetermined width such that the edge of the parking area line at a broken part is accurately detected.

It is desirable to always scan the lines of pixels including the finish point Ea and the start point Sb. However, it is not necessary to scan the lines of all pixels between the finish point Ea and the start point Sb. It may be sufficient to scan a plurality of lines in Y direction at a preset interval. Here, the threshold values for brightness differences and the directions used for this scanning process may be smaller than the threshold values (prescribed values) for brightness differences and the directions used for the edge detection process performed by the edge detection portion 111.

When a rising edge (positive edge) and a falling edge (negative edge) are detected through the scanning process, the edge connection portion 112 determines that information related to a marker is detected. In FIG. 8B, the lines to be scanned and the scanning direction are shown by arrows, and the detected positive edges are shown by white circles, and the detected negative edges are shown by black circles.

When both the rising edges and the falling edges of the brightness are detected in all the scanning lines of pixels including the finish point Ea and the start point Sb, the edge connection portion 112 determines that the parking area line is detected between the edge A and the edge B. Here, the edge connection portion 112 determines that the parking area line is detected even when both the rising edges and the falling edges of the brightness are not detected in one or a few scanning lines. Otherwise, the edge connection portion 112 determines that no parking area line is detected. With this, the detection accuracy of the parking area line increases.

When the parking area line is detected between the endpoints of the two edges A, B and the distance between the two edges A, B is the predetermined interval or shorter, the edge connection portion 112 connects the two edges to create a single edge (connected edge). In the example shown in FIG. 8B, the start point Sa of the edge A becomes the start point of the connected edge, and the finish point Eb of the edge B becomes the finish point of the connected edge. This information is stored in the memory 120, and the information of the edge A and the edge B is deleted from the memory 120.

When no parking area line is detected between the endpoints of the two edges or when the distance between the two edges exceeds the predetermined interval, the edge connection portion 112 determines that these edges are detected from different objects from each other or that these edges are in fact separate edges and thus does not connect the two edges. Accordingly, the information of the edge A and edge B (i.e., start points and finish points thereof) is kept in the memory 120.

The pair of the candidates to be connected is expected to be the same parking area line, and therefore, the extending directions or the angles of these two edges should be identical to each other. However, the directions or the angles may slightly differ from each other due to the distortion correction of the captured images and/or the conversion process of the captured images to the overhead image. When such an angle difference is too large, it may deteriorate the detection accuracy of the parking area line when the two edges are connected. Therefore, depending on the level of the angle difference, it may be preferable not to connect the edges.

Accordingly, the edge connection portion 112 of the first embodiment calculates the distance between the endpoints of the subject edge and the closest edge for each pair of the candidates, compares the calculated distance with the predetermined interval, and decides whether or not to connect the two edges based on the comparison result. Naturally, the distance increases as the angle difference between the two edges increases.

To be specific, the edge connection portion 112 assigns the longer edge as a long edge and the shorter edge as a short edge among the two edges of the pair of the candidates, and calculates the formula for a straight line composed of the long edge. The edge connection portion 112 then connects the long edge and the short edge to create a single edge when the following condition (1) or (2) is satisfied.

(1) The distance from the straight line composed of the long edge to the start point of the short edge is equal to or shorter than a first threshold value, and the distance from this straight line to the finish point of the short edge is equal to or shorter than a second threshold value (where first threshold value<second threshold value).

(2) The distance from the straight line of the long edge to the start point of the short edge is equal to or shorter than the second threshold value, and the distance between the straight line to the finish point of the short edge is equal to or shorter than the first threshold value.

Figure 9A:
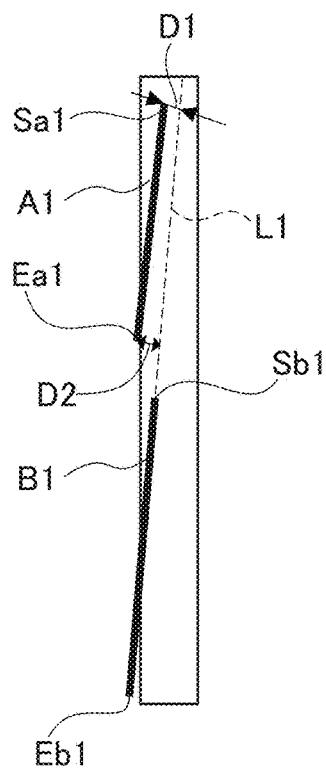
FIG. 9A is a view for explaining an example of an operation of the image processor according to the first embodiment, and the view illustrates a pair of a short edge A1 and a long edge B1.

FIG. 9A shows an example in which a pair of a short edge A1 and a long edge B1 satisfies the condition (1). That is, a distance D1 from a straight line L1 (dashed line) formed by extending the long edge B1 to a start point Sa1 of the short edge A1 is the first threshold value (strict threshold value) or shorter, and a distance D2 from the straight line L1 to a finish point Ea1 of the short edge A1 is the second threshold value (less-strict threshold value) or shorter.

Figure 9B:
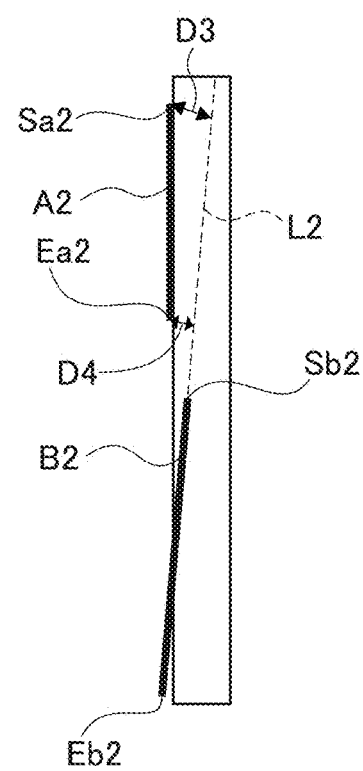
FIG. 9B is a view for explaining an example of an operation of the image processor according to the first embodiment, and the view illustrates a pair of a long edge A2 and a short edge B2.

FIG. 9B shows an example in which a pair of a short edge A2 and a long edge B2 satisfies the condition (2). That is, a distance D3 from a straight line L2 (dashed line) formed by extending the long edge B2 to a start point Sa2 of the short edge A2 is the second threshold value (less-strict threshold value) or shorter, and a distance D4 from the straight line L2 to a finish point Ea2 of the short edge A2 is the first threshold value (strict threshold value) or shorter.

When connecting the two edges satisfying the condition (1) or (2), the edge connection portion 112 of this embodiment assigns the endpoint of the subject edge (e.g., start point of long edge) opposite to the endpoint thereof (e.g., finish point of long edge) close to the closest edge (e.g., short edge) as the coordinate of the start point of the single edge, so as to make the angle of the connected edge closer to the angle of the actual parking area line. Additionally, when the distance between the straight line formed by extending the subject edge (e.g., long edge) and the X-coordinate of the endpoint of the closest edge (i.e., finish point of short edge) opposite to the endpoint thereof (e.g., start point of short edge) close to the subject edge is equal to or shorter than a threshold value (third threshold value), the endpoint of the closest edge (e.g., finish point of short edge) opposite to the endpoint thereof is assigned as the coordinate of the finish point of the single edge. On the other hand, when the distance between the straight line formed by extending the subject edge (e.g., long edge) and the X-coordinate of the endpoint of the closest edge (e.g., finish point of short edge) is greater than the threshold value (third threshold value), an intersection of the straight line extending the subject edge and a line extending perpendicularly from the X-coordinate of the endpoint of the closest edge (e.g., finish point of short edge) opposite to the endpoint thereof (e.g., start point of short edge) to the straight line is assigned as the coordinate of the finish point of the single edge. To be more specific, the edge connection portion 112 executes the following process (3).

(3) The edge connection portion 112 assigns the coordinate of the start point of the long edge (e.g., subject edge) as the coordinate of the start point of the connected single edge when the finish point of the long edge and the start point of the short edge (e.g., closest edge) face each other. The coordinate of the finish point is determined in accordance with the following conditions.

(3-1) When the distance (difference) between the straight line extending the long edge and the X-coordinate of the finish point of the short edge is the third threshold value (strict threshold value) or shorter as well as when the distance between the straight line and the finish point of the short edge is equal to or smaller than a fourth threshold value (less-strict threshold value), the coordinate of the finish point of the short edge is assigned as the coordinate of the finish point of the single edge.

(3-2) When the condition (3-1) is not satisfied, the coordinate of an intersection of the straight line and a line extending perpendicularly from the X-coordinate of the finish point of the short edge to the straight line is assigned as the coordinate of the finish point of the single edge.

On the other hand, (4) when the start point of the long edge (e.g., subject edge) and the finish point of the short edge (e.g., closest edge) face each other, the coordinate of the finish point of the long edge is assigned as the coordinate of the finish point of the single edge and the coordinate of the start point of the short edge is assigned as the coordinate of the start point of the single edge.

Figure 10A:
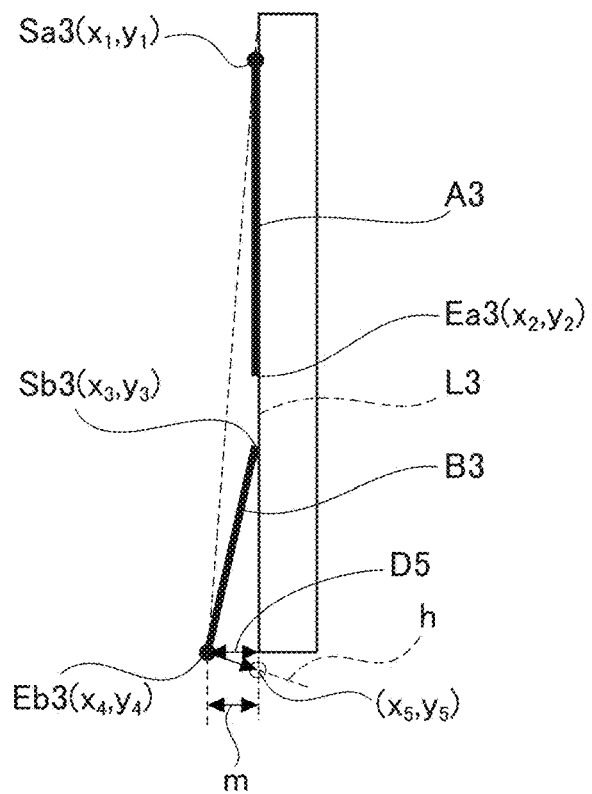
FIG. 10A is a view for explaining an example of an operation of the image processor according to the first embodiment, and the view illustrates a pair of a long edge A3 and a short edge B3.
Figure 10B:
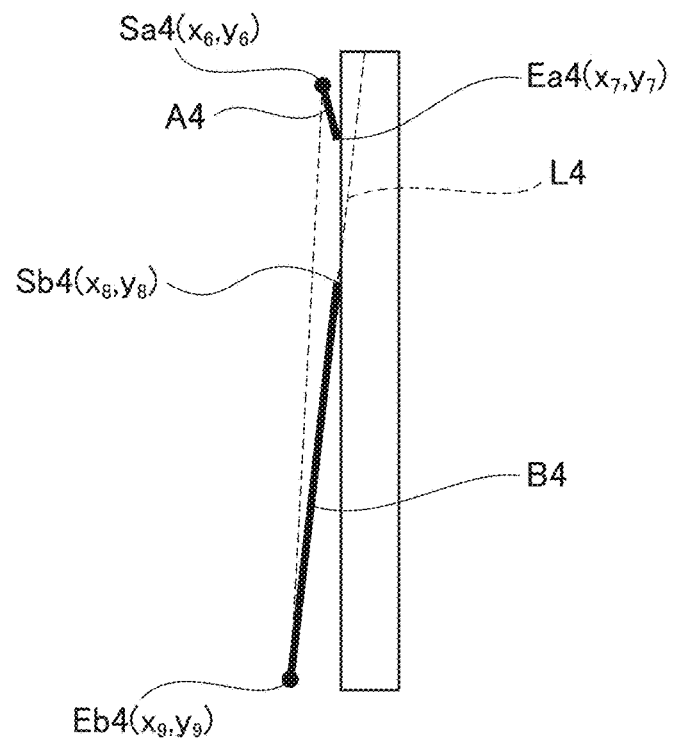
FIG. 10B is a view for explaining an example of an operation of the image processor according to the first embodiment, and the view illustrates a pair of a short edge A4 and a long edge B4.

FIG. 10A and FIG. 10B show examples. FIG. 10A shows an example that satisfies the condition (3). In this example, the edge A3, which is the subject edge, is the long edge, and the edge B3, which is the closest edge of the edge A3, is the short edge. The coordinate of the start point Sa3 of the long edge A3 is denoted as $(x_1, y_1)$, and the coordinate of the finish point Ea3 of the long edge A3 is denoted as $(x_2, y_2)$. Similarly, the coordinate of the start point Sb3 of the short edge B3 is denoted as $(x_3, y_3)$, and the coordinate of the finish point Eb3 of the short edge B3 is denoted as $(x_4, y_4)$. The finish point Ea3 of the long edge A3 and the start point Sb3 of the short edge B3 face each other. Here, a difference between the straight line L3 formed by extending the long edge A3 and the X-coordinate of the finish point Eb3 of the short edge B3 is denoted as m, and the distance between the straight line L3 and the finish point Eb3 of the short edge B3 is denoted as D5.

The coordinate $(x_1, y_1)$ of the start point Sa3 of the long edge A3 is assigned as the coordinate of the start point of the single edge (connected edge) formed by connecting the long edge A3 and the short edge B3. When the difference m and the distance D5 satisfy the condition (3-1): difference m≤third threshold value and distance D5≤fourth threshold value, the coordinate $(x_4, y_4)$ of the finish point Eb3 of the short edge B3 is assigned as the coordinate of the finish point of the connected edge. In the case fallen under the condition (3-2), the coordinate of the finish point of the connected edge is corrected such that the coordinate $(x_5, y_5)$ of the intersection of the straight line L3 and the line perpendicularly extending from the finish point Eb3 of the short edge B3 to the straight line L3 is assigned as the coordinate of the finish point of the connected edge.

FIG. 10B shows an example that satisfies the condition (4). In this example, the edge A4, which is the subject edge, is the short edge, and the edge B is the long edge. The coordinate of the start point Sa4 of the short edge A4 is denoted as $(x_6, y_6)$, and the coordinate of the finish point Ea4 of the short edge A4 is denoted as $(x_7, y_7)$. Similarly, the coordinate of the start point Sb4 of the long edge B4 is denoted as $(x_8, y_8)$, and the coordinate of the finish point Eb4 of the long edge B4 is denoted as $(x_9, y_9)$. The finish point Ea4 of the short edge A4 and the start point Sb4 of the long edge B4, which is closest to the short edge A4, face each other. Here, the coordinate $(x_6, y_6)$ of the start point Sa4 of the short edge A4 is assigned as the coordinate of the start point of the connected edge. Further, the coordinate $(x_9, y_9)$ of the finish point Eb4 of the long edge B4 is assigned as the coordinate of the finish point of the connected edge.

As described above, the edge connection portion 112 assigns the coordinates of the start point and the finish point of the connected edge based on the difference of the lengths of the subject edge and the closest edge as well as based on the distance between the long edge (straight line) and the finish point of the short edge. Additionally, when any one of the above-described distances exceeds the corresponding threshold values, the edge connection portion 112 corrects the coordinate of the finish point of the subject edge. With this, it is possible to set the endpoints of the connected edge more accurately.

Figure 6B:
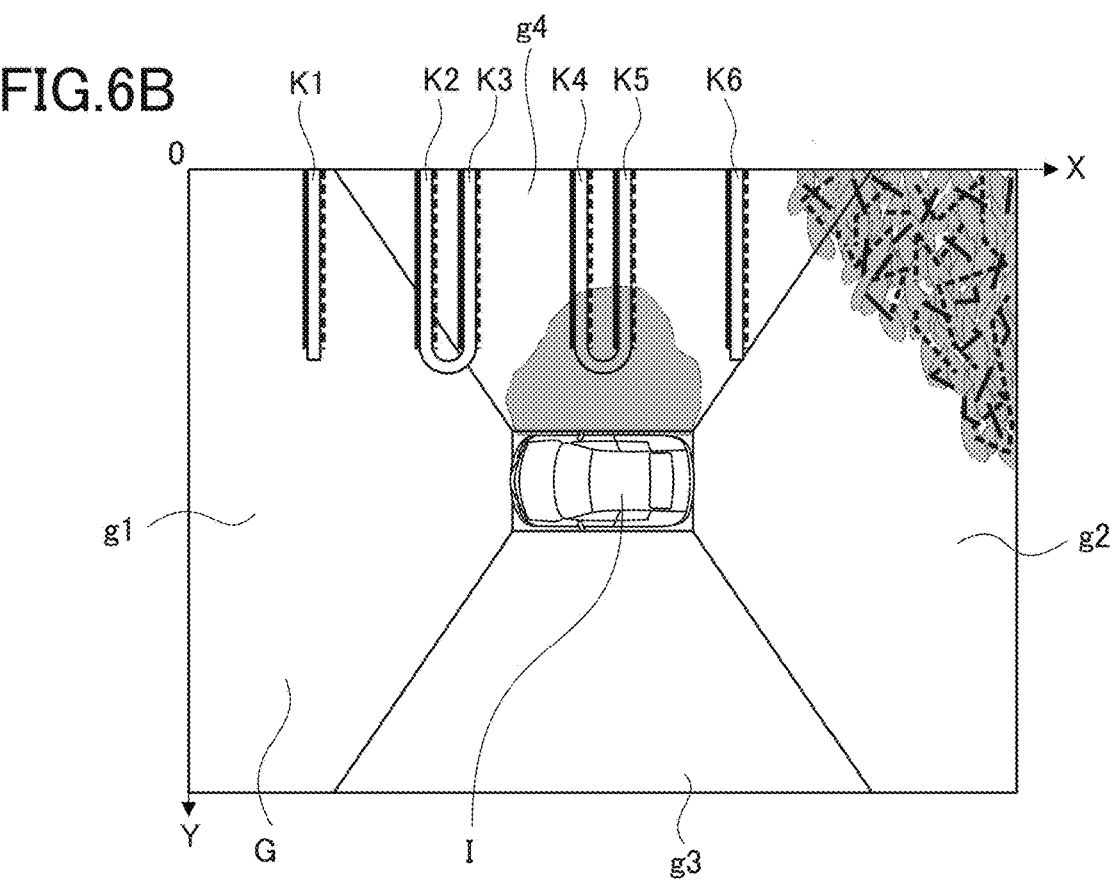
FIG. 6B is a view for explaining an example of an operation of the image processor according to the first embodiment, and the view illustrates the edge broken by a shadow has been connected.

Through the above processes executed by the edge connection portion 112, the broken edges are connected to a single edge. FIG. 6B shows an example in which the broken edges are connected by the edge connection portion 112.

The marker detection portion 113 detects, as the marker, the parking area line based on the edges detected by the edge detection portion 111 and the connected edge connected by the edge connection portion 112. To be specific, the marker detection portion 113 first extracts a line segment of the positive edge and a line segment of the negative edge which have a length of a reference length or longer and extend in a predetermined direction or at a predetermined angle.

The reference length may be a length of the vehicle V (e.g., 5 meters). However, the reference length may be set shorter than the vehicle length when the parking area line is short. The predetermined angle is determined in accordance with the travel direction of the vehicle V, the directions of the cameras 20, and the like. In FIG. 6A, the parking area line extends in a direction substantially perpendicular to the traveling direction, and thus the predetermined angle is set to 90°±permissible error.

Next, the marker detection portion 113 calculates the positions (coordinates) of the start point and the finish point of each of the extracted positive and negative edge line segments. The marker detection portion 113 then extracts the positive edge line segment and the negative edge line segment adjacent to each other at a prescribed interval based on the calculated positions and determines that the edges of the extracted line segments are the pair representing the parking area line. For example, when the distance between the positive edge and the negative edge is within the line width of the parking area line±permissible error, the marker detection portion 113 determines these edges as the pair that represents the parking area line. On the other hand, an edge with a length shorter than the reference length, an edge line segment extending in a direction other than perpendicular to the traveling direction, and an edge line segment for which a paired edge line segment is not found are discarded as noise. In the example shown in FIG. 6B, the parking area lines K1, K2, K3, K4, K5, and K6 are detected.

The parking frame setting portion 114 sets a parking frame and a parking space on the road surface R based on the parking area lines detected by the marker detection portion 113 and then stores parking frame registration data 121 into the memory 120.

To be specific, the parking frame setting portion 114 first selects two adjacent (or opposed) lines that may form a parking frame from the pairs of a plurality of positive edge line segments and negative edge line segments of the parking area lines that have been detected by the marker detection portion 113. The selected two lines should represent the left and right sidelines corresponding to the parking area lines defining the parking space. For example, the selected two lines may represent a negative edge line segment of a parking area line (e.g., K3 shown in FIG. 6B) and a positive edge line segment of an adjacent parking area line (e.g., K4 shown in FIG. 6B).

The parking frame setting portion 114 then calculates a distance between the selected two edge line segments (i.e., inner dimension of adjacent parking area lines) based on the coordinates of the endpoints of the edges. When the calculated distance is within a preset range (e.g., parking space width±permissible error), the parking frame setting portion 114 detects the area defined by the selected two edge line segments as a parking space. Preferably, the parking space width is 2 to 3 meters for standard sized vehicles and small trucks and is 3.3 meters or longer for large trucks or busses.

Here, lines extending along the detected adjacent positive edge line segment and negative edge line segment are estimated as long sidelines of a parking frame 201 (see FIG. 5), and lines connecting the endpoints of the long sidelines are estimated as short sidelines of the parking frame 201. The rectangular frame defined by the long sidelines and short sidelines is the parking frame 201, and the area inside of the parking frame 201 is estimated as the parking space.

As the edge detection by the edge connection portion 112 as well as the detection of the parking area lines by the marker detection portion 113 are realized with high accuracy, the detection of the parking space by the parking frame setting portion 114 is also realized with high accuracy. Accordingly, it is possible to reliably detect the endpoint of a broken parking area line and thus reliably detect the shape and the position of a parking frame and a parking space.

The parking frame setting portion 114 then calculates the coordinates of the endpoints of the adjacent positive edge line segment and the negative edge line segment which represent the parking frame 201 defining the parking space. The calculated results are stored in the memory 120 as the parking frame registration data 121. In order to specify the parking frame 201 with as little memory capacity as possible, only the coordinates of the two of the endpoints for the parking frame 201 located close to the vehicle V may be stored. However, it is also possible to store the coordinates of all four endpoints. Additionally, the other information necessary for automatic parking process, such as the angle (extending direction) of the parking area lines 200, may be added to the parking frame registration data 121.

The parking frame setting portion 114 may additionally determine whether it is possible to park the vehicle V into the set parking frame. For example, when another vehicle or an obstacle is present in the detected parking space, the parking frame setting portion 114 determines that parking is not available and does not store the parking frame registration data 121 into the memory 120. Further, the parking frame setting portion 114 determines that the parking frame closest to the subject vehicle V or the parking frame easy to park is an available parking frame and stores it into the memory 120 as the parking frame registration data 121.

The display control portion 115 sends a display control signal to the navigation device 30 so as to display the road surface images around the vehicle V captured by the cameras 20 or to display the set parking frame image with or without the road surface images on the monitor 31 of the navigation device (display device) 30.

The memory 120 includes a recording medium, for example, a large capacity recording medium such as a hard disk drive and a semiconductor recording medium such as a ROM and a RAM. Various data for use in various operations in the control portion 110 are temporarily or non-temporarily stored in the memory 120.

As described above, the parking frame registration data 121 and parameter data 122 are stored in the memory 120. The parameter data 122 includes, for example, the prescribed value for detecting an edge, the predetermined range and the predetermined interval for detecting the closest edge, the straight line and the start point of an edge, the threshold values for endpoints (i.e., first, second, third, and fourth threshold values), and the threshold number, as well as, the reference length of the borderline such as the parking area line and the traveling lane, the parking space width, and their permissible errors. Furthermore, the memory 120 may store other parameters such as the width and angle of the borderline used by the image processor 100. Additionally, a plurality of parameters may be stored in the memory 120 and appropriate parameters may be selected in accordance with a shape and a size of a parking space (parking frame), a distance between traveling lanes, and a shape of a lane borderline in a country or a region where the parking assistance apparatus 1 is used.

An example of the operation executed by the image processor 100 of the first embodiment will be described with reference to FIG. 4A to FIG. 4C flowcharts.

Figure 4A:
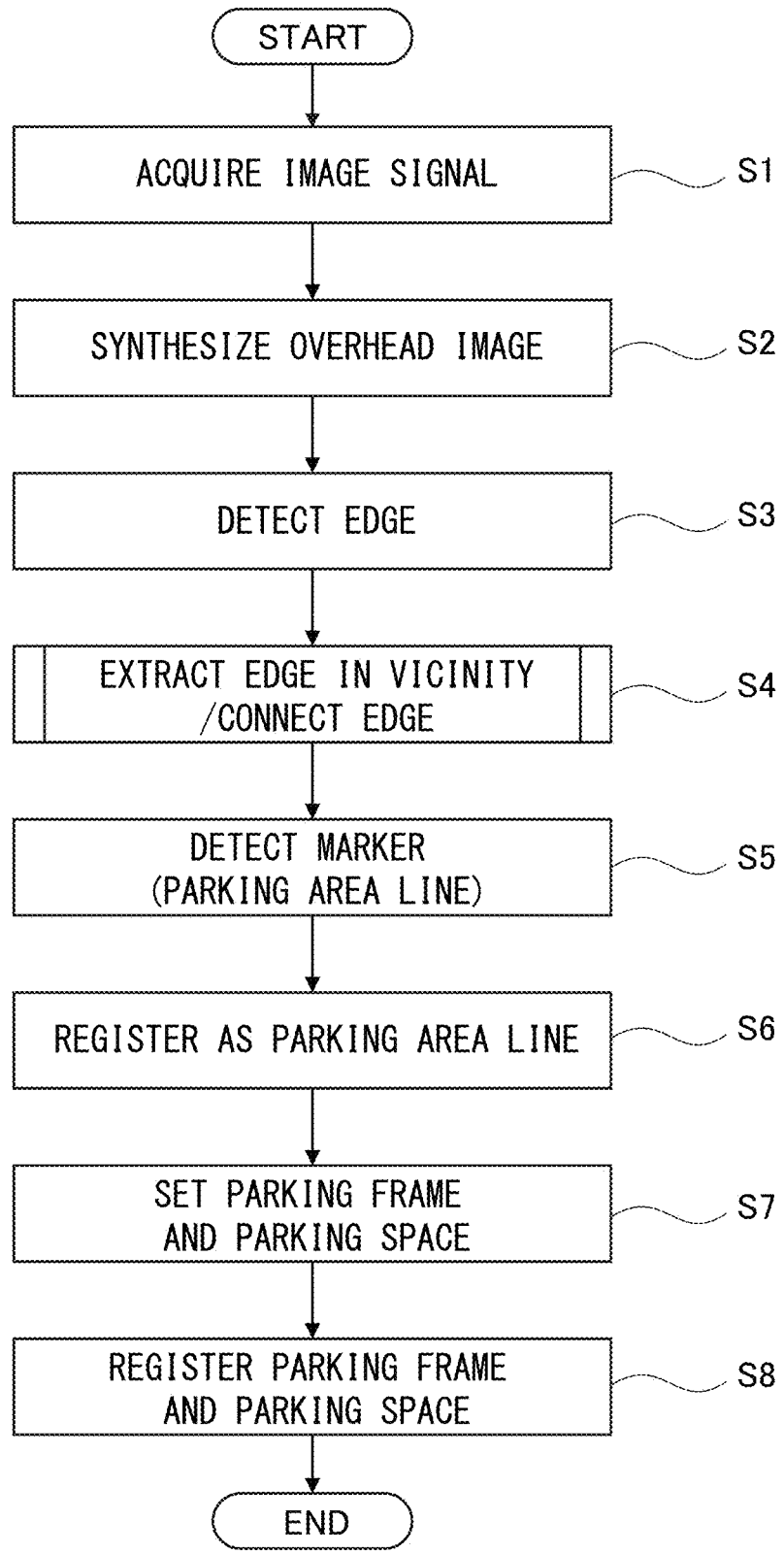
FIG. 4A is a flowchart for explaining an example of an operation of the image processor according the first embodiment.
Figure 4B:
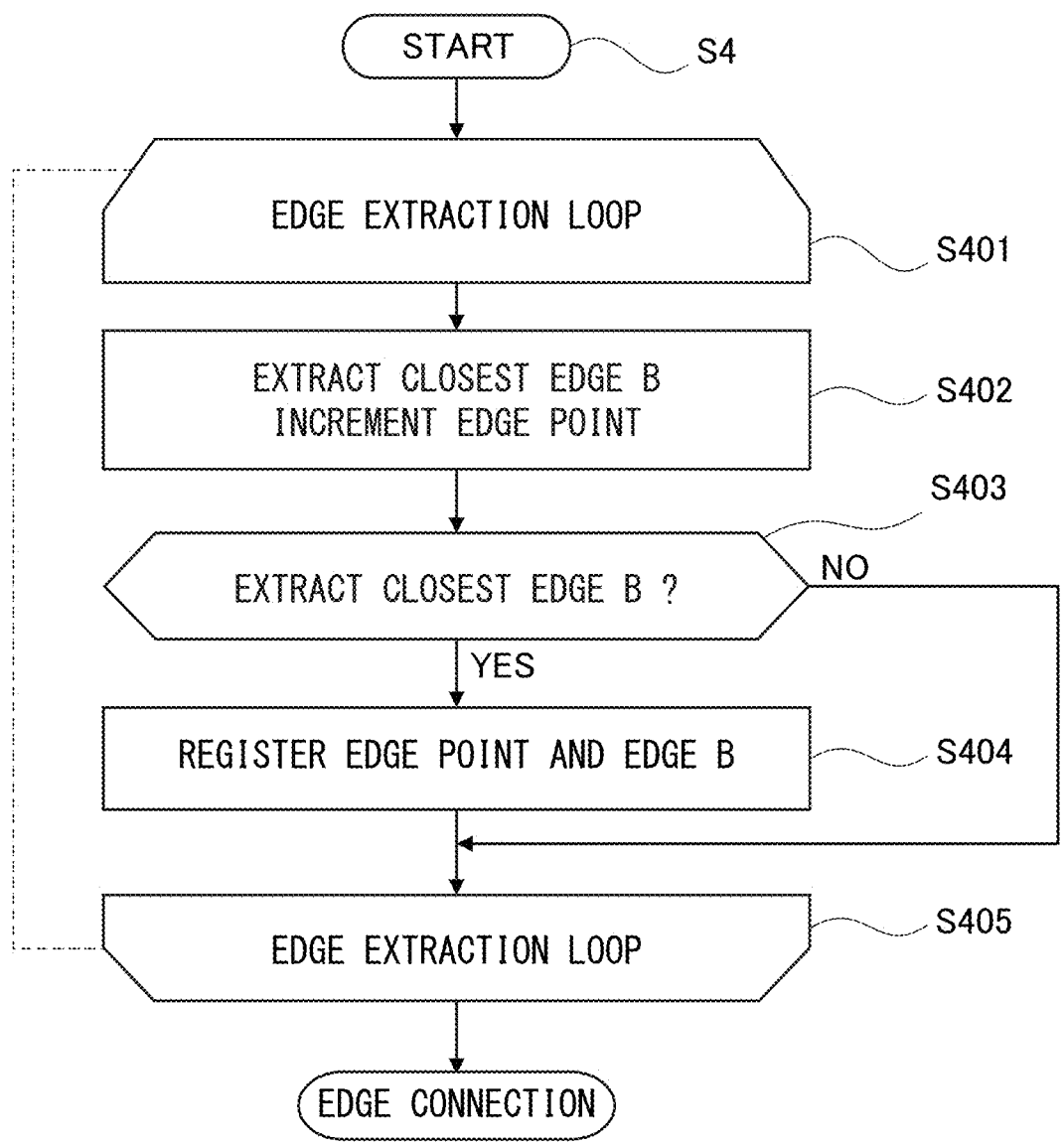
FIG. 4B is a flowchart for explaining an example of an operation of an edge connection portion.
Figure 4C:
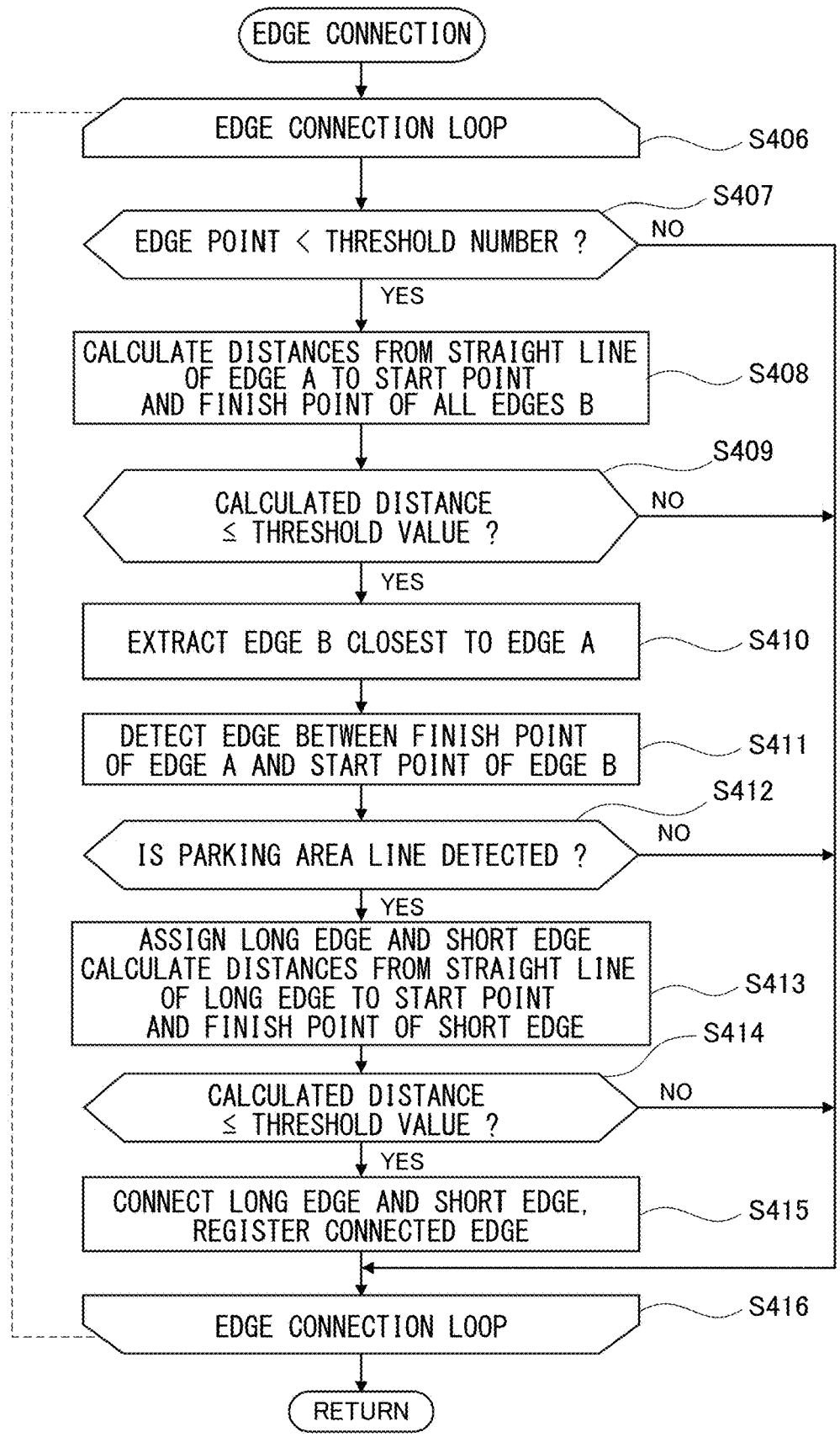
FIG. 4C is a flowchart for explaining an example of an operation of the edge connection portion.

The operation shown in FIG. 4A to FIG. 4C starts in response to the input of the automatic parking start instruction by a driver's operation of the automatic parking start switch (not shown).

In Step S1 of FIG. 4A, the control portion 110 of the image processor 100 acquires image signals from the images of the road surface R around the vehicle V captured by the cameras 20.

In Step S2, the control portion 110 generates a signal in which the image signals acquired in Step S1 are synthesized. The image signal synthesized in Step S2 is for displaying an overlooked image (overhead image G) as if taken by a camera disposed above the vehicle V on the navigation device 30. The technique of creating such an overhead image is known and disclosed in JP1991-99952A or JP2003-118522A as one example.

FIG. 6A and FIG. 6B show an example of the overhead image G generated based on the synthesized signals. The images captured by the cameras 20a to 20d are converted to image signals for displaying the partial overhead images g1, g2, g3, g4, and the converted image signals are synthesized to generate the overhead image G. An icon I representing the vehicle V viewed from the above is displayed in the center of the overhead image G.

It is also possible that the images are not synthesized in step S2 or that the images are synthesized after detecting the positive edge and the negative edge in the next Step S3. However, it is preferable to detect the positive edge and the negative edge after generating the overhead image G since the processing load of the image processor 100 can be reduced.

In Step S3 (edge detection step), the edge detection portion 111 scans the overhead image G synthesized in Step S2 in the predetermined direction and detects the positive edge and the negative edge in the image based on the brightness values of the image signals (see FIG. 6A), as described above.

In Step S4 (edge connection step), the edge connection portion 112 connects the broken edges. The edge connection step executed by the edge connection portion 112 will be described in detail with reference to FIG. 4B and FIG. 4C flowcharts.

In the edge connection step, the edge connection portion 112 executes an edge extraction loop process of Steps S401-S405 shown in FIG. 4B. That is, the edge connection portion 112 extracts an edge B present in the vicinity (in predetermined range) with respect to each edge (edge A) detected by the edge detection portion 111. The loop process of Steps S401-S405 is repeated until the process for all the edges A is completed.

In Step S402, the edge connection portion 112 selects one of the edges detected by the edge detection portion 111 and assigns the selected edge as a subject edge (edge A). The edge connection portion 112 then extracts an edge (edge B) present within the predetermined range (in vicinity) from the endpoint of the selected edge A. Each time the edge B is extracted, an edge point is incremented.

In Step S403, it is determined whether the edge B present within the predetermined range has been extracted. When it is determined that the edge B has been extracted (i.e., edge point>0), the edge point and the information of the extracted edge B are registered in the memory 120 in association with the information of the edge A. When it is determined that no edge B has been extracted (i.e., edge point=0), the process in Step S404 will be skipped and the program returns to Step S402 to execute the process on the next edge A.

When the extraction process is completed for all the edges A, the extraction loop process ends, and the program proceeds to Steps S406 of FIG. 4C, wherein an edge connection loop process of Steps S406-S416 will be executed to connect edges broken by shadows or illumination. The loop process of Steps S406-S416 is repeated until the processes for all the edges A and the edges B present in the vicinity of the edges A are completed.

In Step S407, the edge connection portion 112 determines whether or not the edge point of the selected edge A is less than the threshold number. When it is determined that the edge point of the edge A is less than the threshold number (YES), it is determined that the edge A has little noise and possibly has a connectable edge B. The program therefore proceeds to Step S408.

When it is determined that the edge point of the edge A is the threshold number or greater (NO), it is determined that the edges B present in the vicinity of the edge A are noise caused by shadows of leaves of trees or the like. Therefore, the edge A is not selected as a subject to the edge connection, and the following Steps S408-S415 are skipped. When there is another edge A and the edge B present in the vicinity of the edge A, the program returns to Step S407. When there is no other edge, the edge connection loop process ends.

Figure 8B:
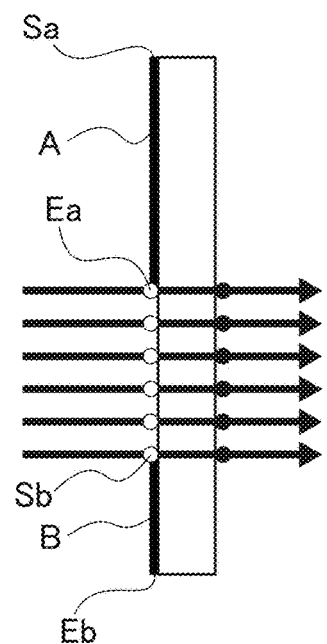
FIG. 8B is a view for explaining an example of an operation of the image processor according to the first embodiment, and the view illustrates a scanning process in an area between the endpoints of the edges A, B.

In Step S408, the edge connection portion 112 calculates distances from the straight line formed by the edge A to the start point and to the finish point of the edge B (see FIG. 8B). In Step S409, the edge connection portion 112 determines whether or not the calculated distances are the threshold value or shorter. When it is determined that the calculated distances are the threshold value or shorter (YES), the program proceeds to Step S410. When it is determined that the calculated distances exceed the threshold value (NO), the program skips the following steps. When there is another edge A and the edge B present in the vicinity of the edge A, the program returns to Step S407. When there is no other edge, the edge connection loop process ends.

In Step S410, the edge connection portion 112 extracts the edge B (i.e., closest edge B) closest to the edge A based on the distances calculated in Step S408. In Step S411, the edge connection portion 112 then scans the area between the finish point of the edge A and the start point of the edge B to detect a positive edge and a negative edge (i.e., detect parking area line). In Step S412, when it is determined that a parking area line is detected (YES), the program proceeds to Step S413. As described above, when a positive edge and a negative edge are detected by the scanning process, the edge connection portion 112 determines that a parking area line is detected. When no parking area line is detected (i.e., when no edge is detected by the scanning step), it is determined that the edge A and the edge B are detected from different objects and the steps after Step S413 are skipped so as to exclude the edges from the subject to be connected. When there is another edge A and the edge B present in the vicinity of the edge A, the program returns to Step S407. When there is no other edge, the edge connection loop process ends.

In Step S413, the edge connection portion 112 compares the edge A and the edge B to assign the longer edge as the long edge and the shorter edge as the short edge. As described with reference to FIG. 9A and FIG. 9B, the edge connection portion 112 then calculates the formula for a straight line composed of the long edge to calculate distances from the straight line of the long edge to the start point and to the end point of the short edge.

In Step S414, the edge connection portion 112 determines whether or not each of the calculated distances is the corresponding threshold value or shorter. To be specific, it is determined whether or not the distance from the straight line composed of the long edge to the start point of the short edge is the first threshold value or shorter and the distance from the straight line to the finish point of the short edge is the second threshold value or shorter (first threshold value<second threshold value). Additionally, it is determined whether or not the distance from the straight line to the start point of the short edge is the second threshold value or shorter and the distance from the straight line to the finish point of the short edge is the first threshold value or shorter.

When the determination of Step S414 is affirmative (YES), the program proceeds to Step S415, in which the edge connection portion 112 connects the long edge and the short edge to create a single edge (connected edge) and registers the connected edge in the memory 120. To be specific, as described with reference to the conditions (3), (4) and FIG. 10A, FIG. 10B, the edge connection portion 112 assigns one of the start points of the long edge and the short edge as the start point of the connected edge and assigns one of the finish point of the long edge and the short edge as the finish point of the connected edge based on the conditions, and registers their positional coordinates into the memory 120. When there is another edge A and the edge B present in the vicinity of the edge A, the program returns to Step S407. When there is no other edge, the edge connection loop process ends.

When the determination of Step S414 is negative (NO), the program skips the Step S415, such that the edges are not connected. When there is another edge A and the edge B present in the vicinity of the edge A, the program returns to Step S407. When there is no other edge, the edge connection loop process ends.

As described above, the image processor 100 is capable of connecting the edge broken by shadows or illuminations, appropriately. Even when an edge is broken into three or more edges, the image processor 100 is capable of connecting the edges into one edge. That is, the image processor 100 first executes the edge connection process to connect the first edge and the second edge. The image processor 100 then executes the edge connection process to further connect the third edge so as to create a connected edge. Similarly, if there are fourth or more edges, the image processor 100 continues the edge connection process to connect all the broken edges so as to create a single edge.

Referring back to FIG. 4A, the program proceeds to Step S5 after the completion of the edge connection process in Step S4. In Step S5 (marker detection process), as described above, the marker detection portion 113 detects a parking area line (i.e., marker) based on the positive and negative edges detected by the edge detection portion 111 and the connected positive and negative edges created by the edge connection portion 112. To be specific, the marker detection portion 113 detects a pair of a positive edge line segment and a negative edge line segment which have a length of the reference length or longer and are aligned next to each other at the prescribed interval. The marker detection portion 113 then determines that the detected pair represents the parking area line. Through this process, edges generated by noise such as shadows of leaves of trees or the like or edges which do not form a pair are discarded as noise.

In the next Step S6, the marker detection portion 113 registers the coordinates of the start points and the finish points of the positive and negative edge line segments into the memory 120 as the data of the parking area line.

In Step S7, the parking frame setting portion 114 sets a parking frame and a parking space through the above-described process based on the parking area lines (e.g., K1-K6 in FIG. 6B) registered in the memory 120.

In Step S8, the parking frame setting portion 114 calculates the coordinate values of endpoints of the adjacent positive edge line segments and negative edge line segments which form each parking frame 201. The parking frame setting portion 114 then registers the calculated coordinate values into the memory 120 as the parking frame registration data 121. Here, the memory 120 may store all of the obtained parking frame registration data 121 or may store only the parking frame registration data 121 that represents a parking frame available for parking.

With this, the process executed by the image processor 100 ends. The parking frame registration data 121 obtained by the image processor 100 is sent to the vehicle control ECU 40 by which the various processes for assisting the parking of the vehicle V are executed.

With the image processor 100 according to the first embodiment, the control portion 110 detects a parking area line on the road surface R as a marker from the image around the vehicle V obtained by the imaging device (cameras) 20. The control portion 110 connects a plurality of broken markers to create a single marker when the detected marker is broken into plural.

To be specific, the edge detection portion 111 of the control portion 110 detects a plurality of edges from the captured image. The edge connection portion 112 detects a closest edge which is closest to a subject edge selected from the detected edges and connects the subject edge and the closest edge to create a single edge when the distance between the endpoints of the subject edge and the closest edge is the threshold value or shorter. That is, the edge connection portion 112 connects the edges broken by shadows or illuminations. The marker detection portion 113 then detects a parking area line as the marker based on the detected edges and the connected edges. Accordingly, the endpoints of each edge are detected at accurate positions. Additionally, the obtained extending direction or the angle of the edge also becomes closer to the true value. As a result, it is possible to provide the image processor 100 and the image processing method that are capable of detecting the parking area line on the road surface as the marker with high accuracy.

Further, the edge connection portion 112 scans the area between the endpoints of the subject edge and the closest edge in the extending direction of the subject edge and determines whether or not any information related to the marker is present between the subject edge and the closest edge. When it is determined that information related to the marker exists, the edge connection portion 112 connects the subject edge and the closest edge so as to connect the broken edges reliably. Accordingly, the coordinate values of the endpoints of the marker become closer to the true values, thereby the detection of the marker is realized with high accuracy.

The edge connection portion 112 also counts the number of edges present within the predetermined range from the subject edge as the edge point. When the edge point is the threshold number or greater, the edge connection portion 112 does not connect the subject edge with another edge. With this, it is possible to exclude edges generated by noise such as shadows (e.g., shadow of building and/or shadows of leaves of trees) from the subject to be connected. As a result, it improves the processing efficiency and processing accuracy.

Additionally, the edge connection portion 112 assigns the endpoint of the subject edge opposite to the endpoint thereof close to the closest edge as the coordinate of the start point of the single edge. Further, when the distance between the straight line formed by extending the subject edge and the X-coordinate of endpoint of the closest edge opposite to the endpoint thereof close to the subject edge is equal to or shorter than the threshold value (third threshold value), the edge connection portion 112 assigns the finish point of the closest edge as the coordinate of the finish point of the single edge. On the other hand, when the distance between the straight line formed by extending the subject edge and the X-coordinate of the finish point of the closest edge exceeds the threshold value (third threshold value), the edge connection portion 112 assigns the intersection of the straight line extending the subject edge and a line extending perpendicularly from the X-coordinate of the finish point of the closest edge to the straight line as the coordinate of the finish point of the single edge. Accordingly, it is possible to accurately detect the endpoints of the single edge, and the extending direction of the single edge becomes closer to the extending direction of the actual marker, thereby improving the accuracy for detecting the marker.

When the marker is a parking area line which defines a parking space, the image processor 100 includes the parking frame setting portion 114 that sets a parking frame based on the marker detected by the marker detection portion 113. With this, it is possible to detect the parking frame more accurately. By applying the image processor 100 and the image processing method of this embodiment to a parking assistance apparatus and a parking assistance method, the accuracy of resulting parking position increases, such that it is possible to assist the parking operation more appropriately.

When the marker is a lane borderline which defines a traveling lane, the image processor 100 includes a traveling lane detection portion 114' that detects a traveling lane based on the marker detected by the marker detection portion 113. With this, it is possible to detect the traveling lane more accurately. By applying the image processor 100 and the image processing method of this embodiment to a traveling assistance apparatus and a traveling assistance method, it is possible to assist the traveling operation more appropriately. In this case, the traveling lane detection portion 114' registers coordinate values of endpoints of adjacent positive edge line segments and negative edge line segments which form each traveling lane borderline into the memory 120 as traveling lane registration data 121' (see FIG. 17).

Second Embodiment

Hereinafter, a second embodiment of this disclosure will be described with reference to the drawings. An example of the schematic configuration of a parking assistance apparatus to which an image processor of the second embodiment is applied and the arrangement of the imaging device of the parking assistance apparatus are identical to those of the parking assistance apparatus shown in FIG. 1 and FIG. 2 to which the image processor of the first embodiment is applied. Therefore, the detailed description regarding the configuration and arrangement of the parking assistance apparatus will be omitted.

Figure 11:
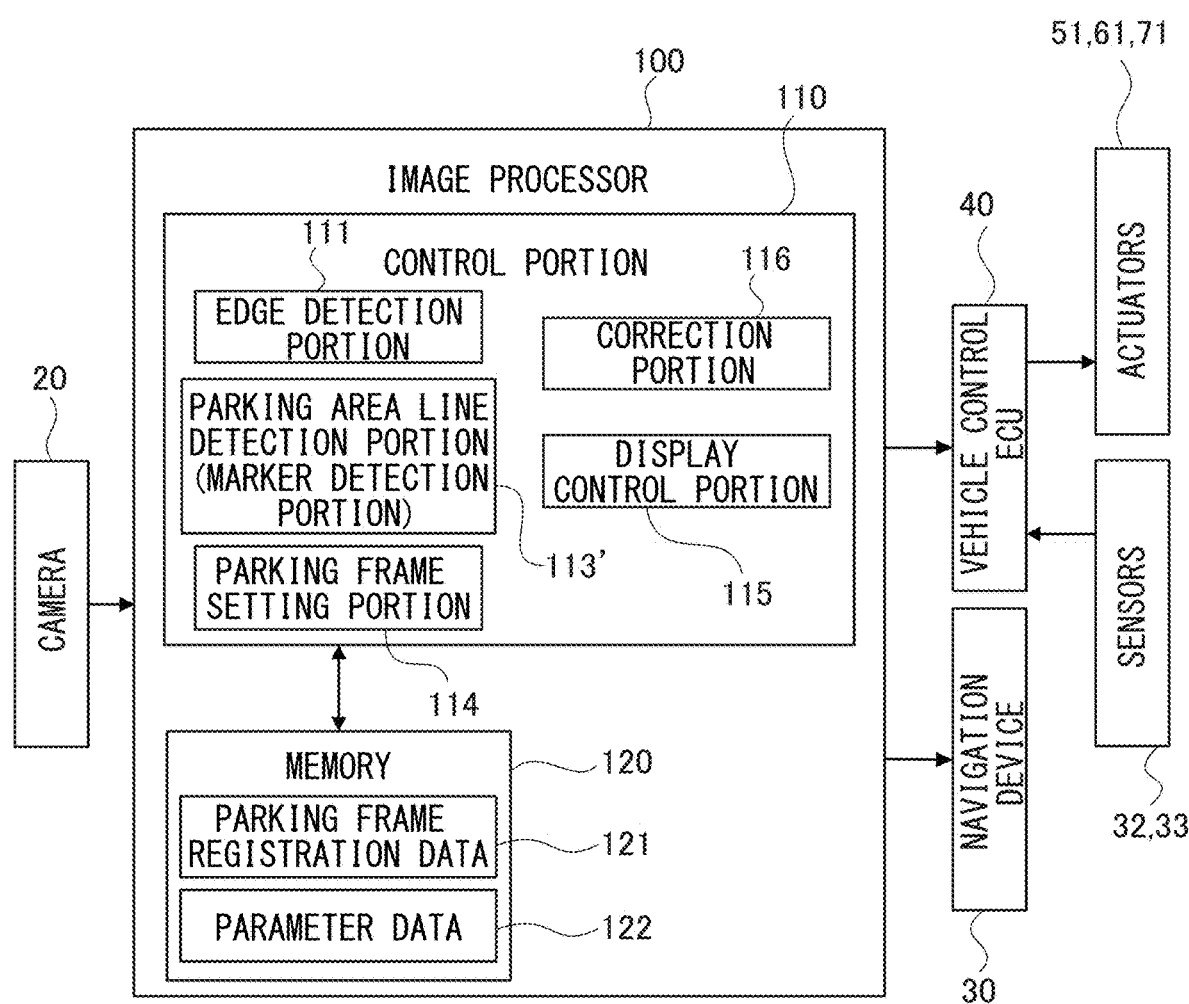
FIG. 11 is a functional block diagram illustrating a schematic configuration of the image processor of a second embodiment.

FIG. 11 is a functional block diagram for showing the schematic configuration of an image processor 100 according to the second embodiment. The image processor 100 of the second embodiment includes a control portion 110 and a memory 120. The control portion 110 is mainly constituted by the CPU of the camera ECU 21, and the memory 120 is mainly constituted by the ROM, the RAM, the flash memory, and the like of the camera ECU 21.

The control portion 110 controls the entire image processor 100. In addition, the control portion 110 sends information (e.g., position and shape of parking space and/or parking lot) necessary for the automatic parking process to the vehicle control ECU 40. The vehicle control ECU 40 executes the automatic parking process to automatically park the vehicle V at an available parking frame based on a parking space or parking area lines defining the parking space. The parking area lines are detected and defined by an edge detection portion 111, a parking area line detection portion 113', a parking frame setting portion 114, and a correction portion 116. Here, the parking area line detection portion 113' corresponds to a marker detection portion.

A control program is stored in the memory 120 of the image processor 100. This control program is executed by the control portion 110 at the startup of the image processor 100. The image processor 100 includes a functional configuration as illustrated in FIG. 11.

The process executed by the vehicle control ECU 40, the hardware configuration of the control portion 110 and the memory 120 are identical to those of the first embodiment, and thus the detailed description thereof will be omitted.

As shown in FIG. 11, the control portion 110 includes the edge detection portion 111, the parking area line detection portion 113', the parking frame setting portion 114, the correction portion 116, and a display control portion 115.

The edge detection portion 111 detects an edge of a marker such as a parking area line on a road surface R of a parking lot P, for example, by edge detection based on the image signal output from the cameras 20 that image the road surface R around the vehicle V. Since the function of the edge detection portion 111 is identical to that of the edge detection portion 111 of the first embodiment, the detailed description thereof will be omitted.

FIG. 13A schematically shows an overhead image G and edges detected from the overhead image G with thick solid lines and thick dashed lines. Similar to FIG. 6A, in FIG. 13A, the X-axis of the overhead image G is in the left and right direction of the drawing (i.e., direction along traveling direction of vehicle V and direction orthogonal to extending direction of parking area line 200), and the Y-axis thereof is in the vertical direction of the drawing (i.e., extending direction of parking area line 200).

In this embodiment, "front portion" and "front" of the parking frame 201 described herein are meant to be a portion close to the vehicle V, and "rear portion" and "rear" are meant to be a portion opposite to "front portion" and "front". As to the four vertexes (endpoints) constituting the rectangle of the parking frame, that is, as to the two endpoints of the two sidelines of the parking frame along the parking area lines 200, the endpoints close to the vehicle V are referred to as "start points" and the endpoints at the rear portion are referred to as "finish points".

The parking area detection portion 113' detects a parking area line as a marker based on the edges detected by the edge detection portion 111. To be specific, the parking area line detection portion 113' extracts a positive edge line segment and a negative edge line segment which have a length of a reference length or longer and which extend in a predetermined direction (angle) from the positive and negative edge line segments detected by the edge detection portion 111. In other words, the parking area line detection portion 113' does not extract a positive edge line segment or a negative edge line segment which has a length shorter than the reference length or which extends in a direction other than the predetermined direction. With this, the edges which are noise generated by light reflection on the road surface, garbage, dirt, and the like are discarded.

Similar to the first embodiment, the reference length in the second embodiment may be a length of the vehicle V (e.g., 5 meters). However, the reference length may be set shorter than the vehicle length when the parking area line is short. Also, the predetermined angle is determined in accordance with the travel direction of the vehicle, the directions of the cameras 20, and the like. In FIG. 13A, the parking area line extends in a direction substantially perpendicular to the traveling direction, and thus the predetermined angle is set to 90°±permissible error.

The parking area line detection portion 113' calculates the positions (coordinates) of the start point and the finish point of each of the extracted positive and negative edge line segments. The parking area line detection portion 113' then extracts the positive edge line segment and the negative edge line segment adjacent to each other at a prescribed interval based on the calculated positions and determines that the edges of the extracted line segments are the pair representing the parking area line. For example, when the distance between the positive edge and the negative edge is within the line width of the parking area line±permissible error, the parking area line detection portion 113' determines that these edges as the pair.

On the overhead image G in FIG. 13A, the extracted positive edge line segments Ep (thick solid lines) and the extracted negative edge line segments Em (thick dashed lines), each of which has a length of the reference length or longer and extends in the predetermined angle, are schematically shown. In an example shown in FIG. 13A, the positive edge line segments Ep1-Ep6 and the negative edge line segments Em1-Em6 are detected on both sides of the parking area lines (images of parking area lines) K1-K6 and extracted as pairs forming the parking area lines K1-K6.

In the parking area lines K4, K5, their edge line segments are broken or interrupted by a shadow S. As a result, in addition to the line segments having a length of the reference length or longer (i.e., positive edge line segments Ep4, Ep5 and negative edge line segments Em4, Em5), the line segments having a length shorter than the reference length (i.e., positive edge line segments Ep7, Ep8 and negative edge line segments Em7, Em8) are also detected. Additionally, a further edge may also be detected, for example, between the line segment Ep4 and the line segment Ep7. As the edge line segments Ep7, Ep8, Em7, Em8 are shorter than the reference length, these line segments will be discarded by filtering. If, however, the edge line segments Ep7, Ep8, Em7, Em8 are the reference length or longer, they may be extracted as other pairs forming the parking area lines. For the parking area line K6, the pair of the positive edge line segment Ep6 and the negative edge line segment Em6 which have a length shorter than the actual parking area line K6 due to the shadow S is extracted.

Such a phenomenon occurs due to the brightness difference of the road surface between the area with shade and the area without shade as well as due to the brightness difference of the parking area line between the areas with and without shade. That is, the brightness differences between the parking area line and the road surface, and/or the edge angles (directions) may be different between the area without shade and the area with shade. Thus, the edges in the area without shade and the edges in the area with shade may be detected as separate edges. Additionally, the edges in the vicinity of a boundary between the area without shade and the area with shade may not be detected. Additionally, when a part of the parking area line is illuminated by road lights or headlights strongly, the brightness difference between the road surface and the parking area line in the image changes or highlight clipping may occur, and thus the similar issue may be found.

Therefore, the detected length of the edge of the parking area line may be different from the actual length, or the parking area line may be detected as a plurality of broken edges so that a plurality of parking frames may be set for a single parking frame, resulting in deterioration of detection accuracy. In this embodiment, the correction portion 116 corrects the endpoints of the parking area lines for a parking frame. That is, in this embodiment, the parking area line detection portion 113' detects parking area lines, the parking frame setting portion 114 sets a parking frame based on the detected parking area lines, and the correction portion 116 executes the correction.

The parking frame setting portion 114 sets a parking frame based on the pairs of edges which represent parking area lines and are detected by the parking area line detection portion 113'. Since the function of the parking frame setting portion 114 of the second embodiment is similar to that of the parking frame setting portion 114 of the first embodiment, the detailed description thereof will be omitted. Similar to the first embodiment, the parking frame setting portion 114 selects two adjacent edge line segments that may represent a parking space from the positive edge line segments and the negative edge line segments. In particular, as the lines which represent the left and right sidelines corresponding to the parking area lines defining a parking space, the parking frame setting portion 114 selects, for example, the negative edge line segment Em1 of the parking area line K1 and the positive edge line segment Ep2 of the adjacent parking area line K2 in FIG. 13A.

The parking frame setting portion 114 detects an area defined by two positive and negative edge line segments adjacent to each other within a preset range as a parking space. In the second embodiment, the parking frame setting portion 114 assigns the two endpoints of the positive edge line segment and the two endpoints of the negative edge line segment as the four endpoints of a parking frame and registers the positions (coordinate values) of the four endpoints to send the information to the correction portion 116.

Similar to the first embodiment, the parking frame setting portion 114 of the second embodiment may determine whether or not it is possible to park the subject vehicle V at the set parking frame.

With the parking frame setting portion 114 as described above, three parking frames a1, a2, a3 are set between the parking area lines K1-K6 in the example of FIG. 13A. However, the detected edges of the parking area lines K4-K6 are shorter than the actual length and the endpoints thereof are detected at different positions from the actual positions. Hence, the parking frames a2, a3 are not detected as a rectangular shape but detected as a trapezoidal shape or a parallel quadrilateral shape.

In order to correct the shapes of the parking frames, the correction portion 116 determines, for each parking frame, whether or not a continuous parking area line is present on the extension line of the parking area line from a position separated from the parking area line by a preset distance. That is, the correction portion 116 determines whether or not an additional parking area line exists on the extension line of the detected parking area line. When an additional parking area line is found, the correction portion 116 connects the first detected parking area line with the additional parking area line to create a single parking area line. The parking frame setting portion 114 then sets (corrects) the parking frame with the single parking area line connected by the correction portion 116.

To be specific, the correction portion 116 determines whether there is a shadow or the like in order to determine that the edges of the parking area line representing the parking frame are divided (i.e., broken or interrupted) by the shadow or the like. To that end, the correction portion 116 scans the overhead image G including the pixels offset from the endpoint of the edge of the parking area line detected by the parking area line detection portion 113' toward a preset direction side (i.e., scanning source side for positive edge and scanning destination side for negative edge) by a preset amount (may also referred to as "shadow search offset amount α"), in the extending direction of the parking area line for a preset length (may also referred to as "shadow search length β"). Based on the scanning results, the correction portion 116 calculates the brightness difference between the adjacent pixels. When it is determined that the absolute value of the brightness difference between the adjacent pixels is a preset value or greater, the correction portion 116 determines that the parking area line is divided by a shadow, faintness, or the like. When it is determined that the absolute value of the brightness difference is less than the preset value, the correction portion 116 determines that the parking area line is not divided. It should be noted that the correction portion 116 only needs to recognize the presence of a brightness difference (or contrast) between the adjacent pixels through the process. Therefore, when the correction portion 116 scans the overhead image G with reference to the detected endpoint of the parking area line, the correction portion 116 can use the preset value smaller than the prescribed value used by the edge detection portion 111 to detect edges and the correction portion 116 does not need to analyze the angle or the direction of the edges.

When determining the parking area line is divided, the correction portion 116 determines whether or not another parking area line to be connected exists at a position separated from the parking area line by the preset distance (may also referred to as "offset amount γ for search start point") in the extending direction of the parking area line. To be specific, the correction portion 116 scans the overhead image G for a given length (may also referred to as "search success determination length δ") in the direction orthogonal to the extending direction of the parking area line from the position separated from the parking area line by the offset amount γ toward the extending direction of the parking area line. The correction portion 116 then determines whether or not there is a pair of an edge at which the brightness difference between adjacent pixels increases more than a given value in the positive direction and an edge at which the brightness difference between adjacent pixels increases more than the given value in the negative direction. It should be noted that the correction portion 116 can use the given value smaller than the prescribed value used by the edge detection portion 111 to detect edges and the correction portion 116 does not need to analyze the angle or the direction of the edges.

Upon extracting a pair of a positive edge and a negative edge, the correction portion 116 determines that there is another parking area line which is divided by a shadow or the like and is to be connected with the subject parking area line. The correction portion 116 thus continues the scanning process to detect an endpoint of the divided parking area line. The correction portion 116 then assigns the endpoint of the edge of the subject parking area line and the endpoint of the edge of the divided parking area line on the scanning direction side as both endpoints of a parking frame and registers these endpoints (coordinate values) in its working area to correct or update the information of the parking frame. The parking frame setting portion 114 registers the updated information of the parking frame in the working area into the memory 120 as the parking frame registration data 121.

When no pair of the edges are detected after the scanning the overhead image G with the search success determination length δ or when the detected pair has a length shorter than the length δ, the correction portion 116 terminates the scanning process. In this case, the correction portion 116 determines that there is no divided parking area line for the subject parking area line and does not correct or update the working area. As a result, the parking frame setting portion 114 registers the endpoints (coordinate values) of the edge line segments of the subject parking area line into the memory 120 as the parking frame registration data 121.

The search process of a shadow or the like and search process of an edge of a divided parking area line are preferably executed for each of one endpoint and the other endpoint of the adjacent positive and negative edge line segments that represent a parking frame. Accordingly, it is possible to correct four endpoints (coordinate values) of the parking frame to the points closer to the true values.

It should be noted that the values α to δ are not specifically fixed but are determined appropriately depending on, for example, functions used for image processing, the edge detection method, the image resolution, the shooting range, and the environment of the parking lot P (e.g., presence of building, fence, and/or illumination). To be specific, the shadow search offset amount α may be set to 5 pixels and the shadow search length β may be set to 15 pixels so as to appropriately determine the presence of a shadow.

Additionally, the offset amount γ for search start point may be set to 10 pixels and the search success determination length δ may be set to 5 pixels so as to detect a divided parking area line with a final length of 15 pixels or more and to connect it with the subject parking area line. On the other hand, a parking area line with a final length less than 15 pixels is not connected to the subject parking area line and discarded. In this embodiment, the 100 pixels in the image correspond to 3 meters. Therefore, when the parking area line is divided or interrupted by a length of 45 centimeters or longer, the endpoints of the parking area line and of the parking frame are corrected such that the length of the parking area line is corrected. On the other hand, when the interrupted length of the parking area line is less than 45 centimeters, the endpoints of the parking area line and of the parking frame are not corrected such that the length thereof is not corrected.

However, when the error of the endpoint is less than 15 pixels (i.e., 45 centimeters), the error may be within an acceptable range that can be corrected by the conventional image processing. Even if a mark representing uncorrected parking frame is displayed in the image on the monitor 31, it gives little sense of discomfort to the user and little influence on the parking assistance. When the reference length of the parking area line is set to 5 meters, the offset amount γ is set to 10 pixels (i.e., 30 centimeters) and the search success determination length δ is set to 5 pixels (i.e., 15 centimeters). That is, the length of the offset amount γ is set to 6% and the length δ is set to 3% of the parking area line. By setting the offset amount γ to be 6% or less of the parking area line and the search success determination length δ to be 3% or less of the parking area line, it is possible to detect the broken parking area line with high accuracy and high speed.

Figure 13B:
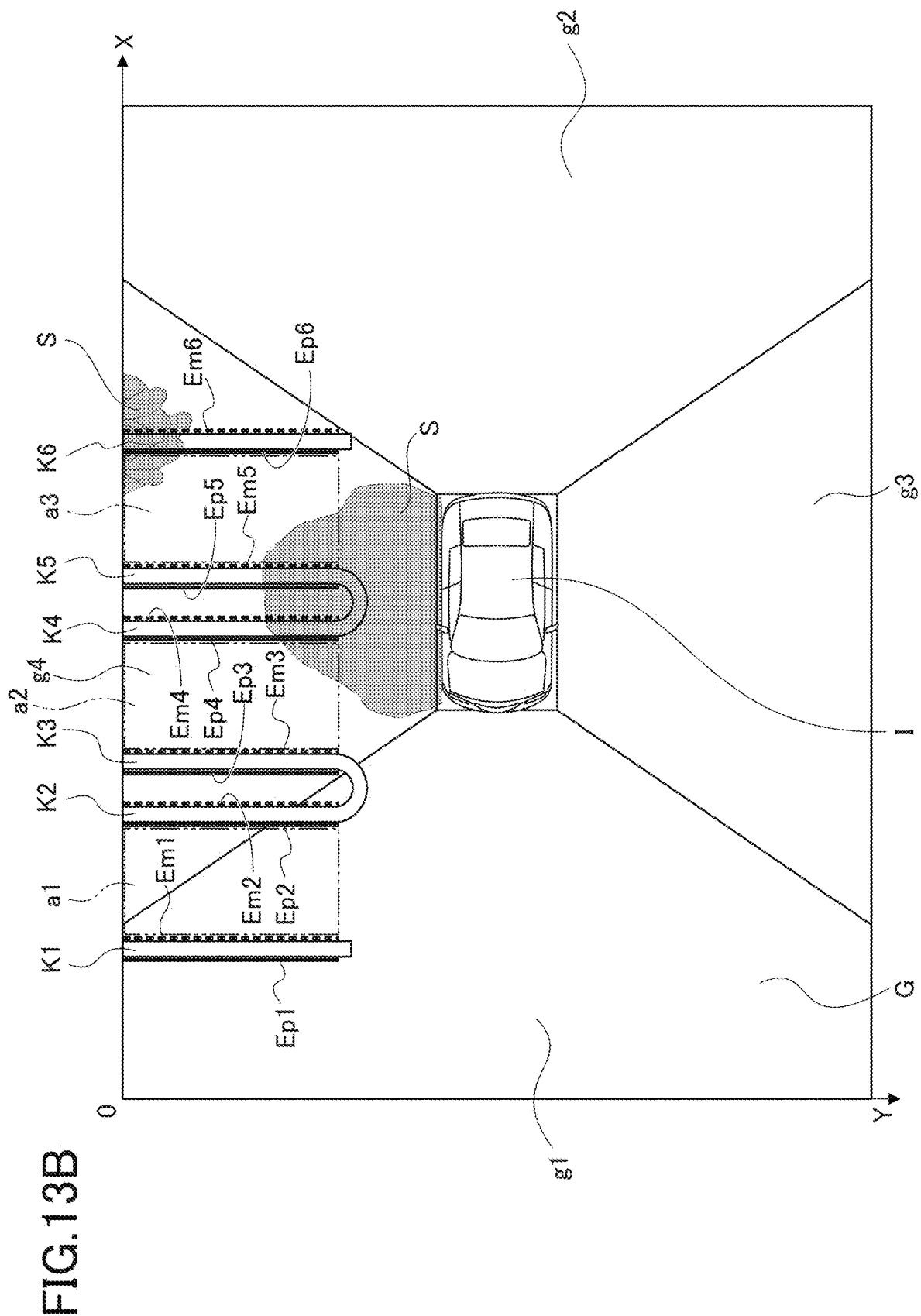
FIG. 13B is a view for explaining an example of an operation of the image processor according to the second embodiment, and the view schematically shows an edge the endpoints of which are appropriately corrected and also shows a parking frame.

FIG. 13B schematically shows the corrected edges and the corrected parking frames a2, a3 after the correction process executed by the correction portion 116. As shown in FIG. 13B, the start points (points close to icon I) of the positive edge line segments Ep4, Ep5 and of the negative edge line segments Em4, Em5, as well as the finish points (points away from icon I) of the positive edge line segment Ep6 and of the negative edge line segment Em6 have been appropriately corrected to be closer to the true values. By correcting the endpoints of the parking frames a2, a3 appropriately, the detection accuracy of the parking frames improves.

Figure 14A:
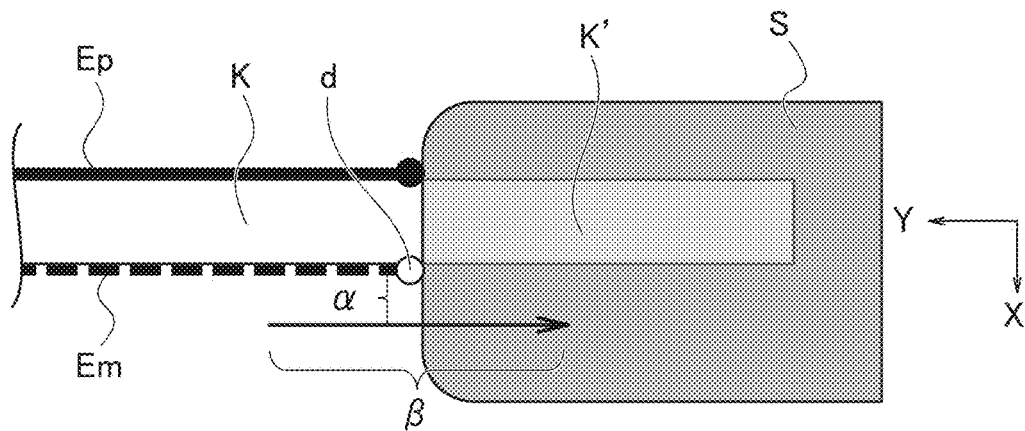
FIG. 14A is a view for explaining an example of an operation of the image processor according to the second embodiment, and the view illustrates a correction process executed when a broken parking area line exists.
Figure 14A:
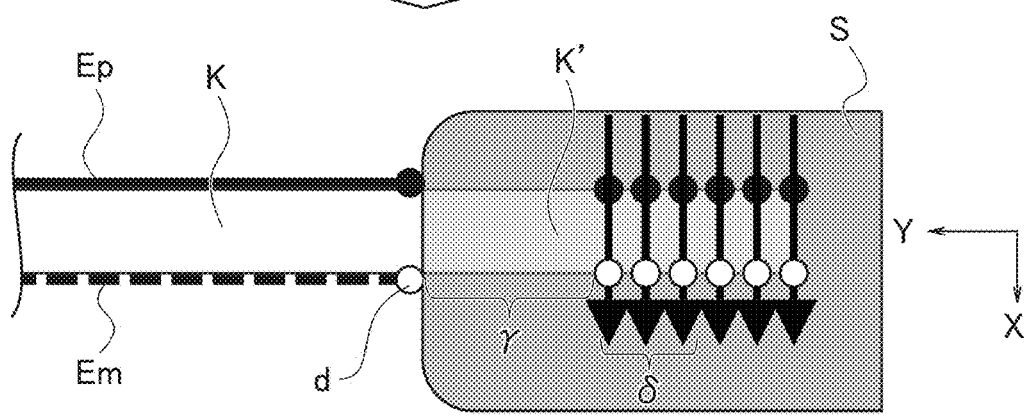
Figure 14B:
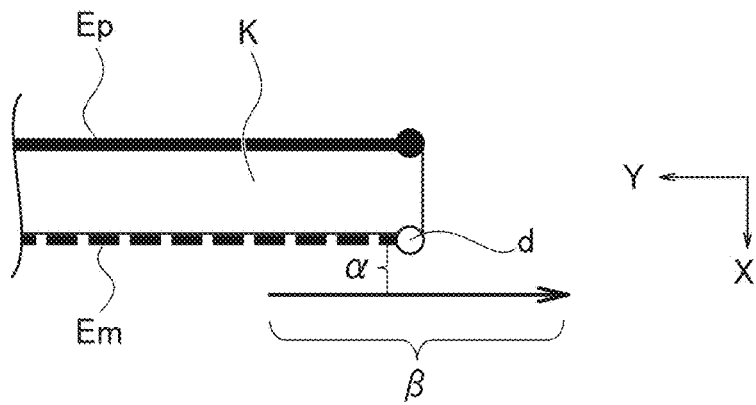
FIG. 14B is a view for explaining an example of an operation of the image processor according to the second embodiment, and the view illustrates the correction process executed when a broken parking area line does not exist.
Figure 15:
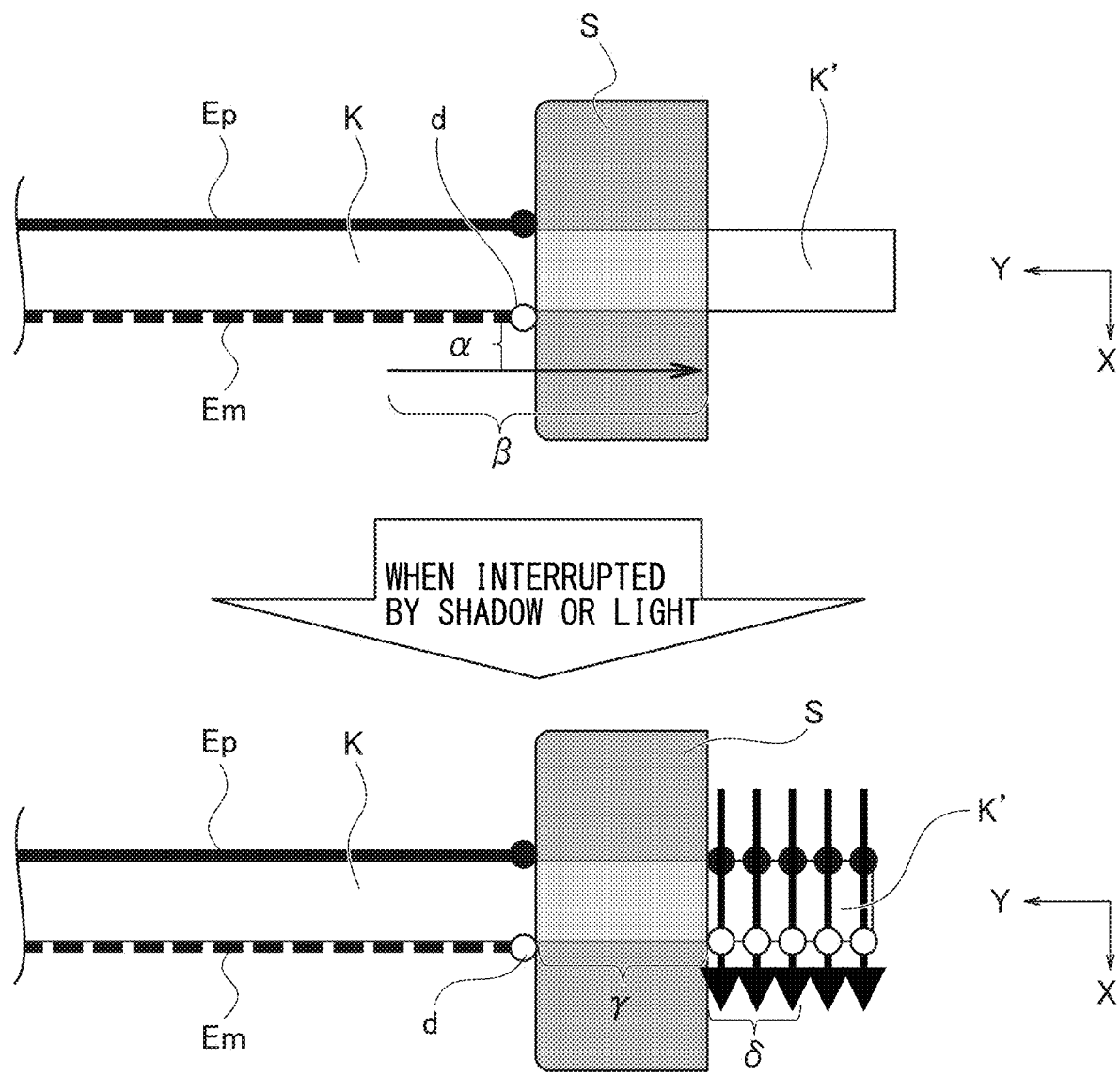
FIG. 15 is a view for explaining an example of an operation of the image processor according to the second embodiment, and the view illustrates the correction process executed when a broken parking area line exists.
Figure 16:
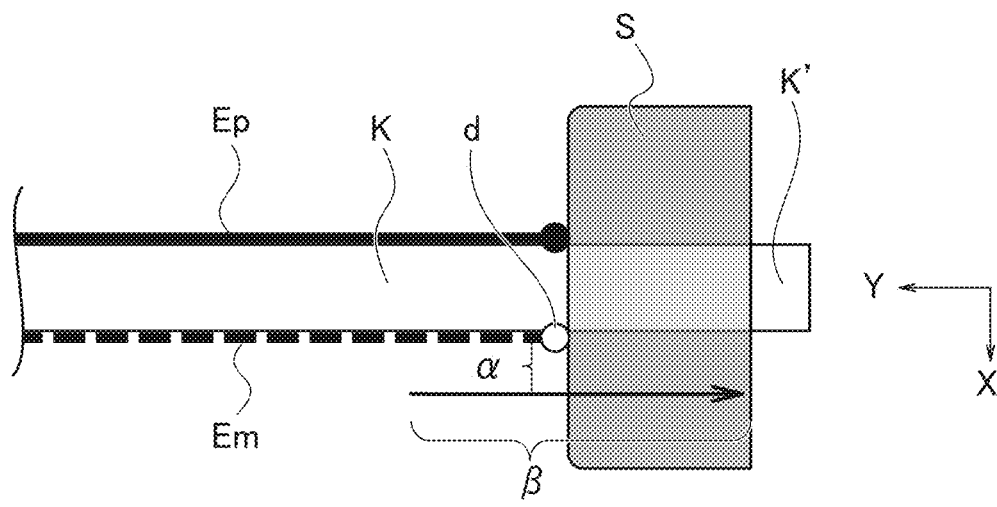
FIG. 16 is a view for explaining an example of an operation of the image processor according to the second embodiment, and the view illustrates the correction process executed when a broken parking area line exists.
Figure 16:
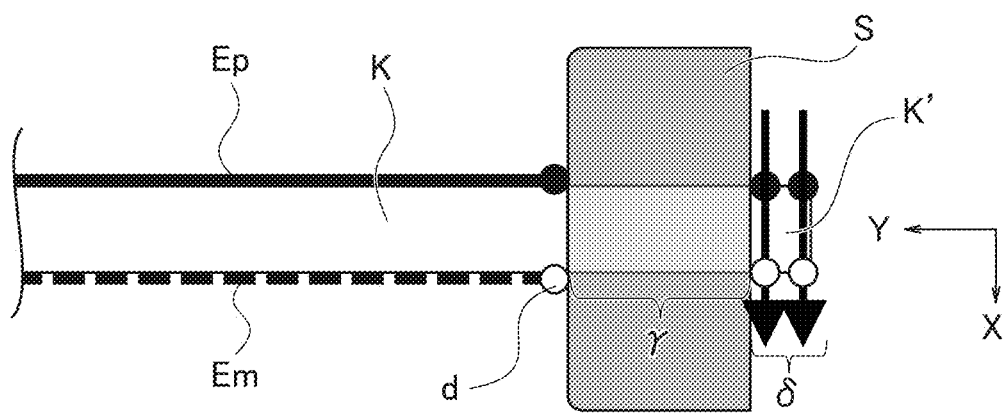

Hereinafter, the correction process for the parking frames executed by the correction portion 116 will be described with reference to FIGS. 14A-16. FIG. 14A is a view for explaining the correction process when a divided or interrupted parking area line exists, while FIG. 14B is a view for explaining the correction process when a divisional or interrupted parking area line does not exist. FIG. 15 and FIG. 16 are views for explaining the correction process when another divided or interrupted parking area line exists. In these views, similar to FIG. 13A, the X-axis is in the direction orthogonal to the parking area line and the Y-axis is in the extending direction of the parking area line. In FIGS. 14A-16, the end of the divided parking area line at the detection destination (i.e., one end of parking area line K) is referred to as a "tip end", and the other end thereof (not shown) is referred to as a tail end.

FIG. 14A shows an example in which the tip end of the parking area line K is broken and not detected due to the shadow S. In this example, in order to determine whether or not the parking area line is divided or interrupted by the shadow S, the correction portion 116 scans the image including the pixels offset from the endpoint d of the edge line segment (in this example, negative edge line segment Em) toward the scanning source side (i.e. X-axis positive direction) by the shadow search offset amount α, in the extending direction of the negative edge line segment Em (i.e., Y-axis negative direction) for the shadow search length β. The correction portion 116 then calculates the brightness difference between the adjacent pixels. With this scanning process, the correction portion 116 determines whether or not the absolute value of the brightness difference between the adjacent pixels is the preset value or greater. In the example of FIG. 14A, the scanning area changes from the road surface R to the area with the shadow S, the absolute value of the brightness difference between the adjacent pixels at the borderline is the preset value or greater. Accordingly, the correction portion 116 determines that the parking area line is divided or interrupted by the shadow S.

Next, the correction portion 116 further scans the image in the X-axis positive direction from the position offset from the endpoint d of the negative edge line segment Em by the offset amount γ for search start point in the extending direction of the line segment. During this process, the correction portion 116 scans the image one pixel at a time in the Y-axis negative direction with a width of the parking area width+a predetermined width in the X-axis direction. When a pair of the positive and negative edges is detected after scanning the image by the search success determination length δ from the offset position, the correction portion 116 determines that the broken parking area line K' exists. In the example of FIG. 14A, the positive edges (shown by black circles) and the negative edges (shown by white circles) are detected for a length of the determination length δ or longer in the shadow S. Additionally, this scanning process is continued until no positive and negative edges are detected (i.e., until the scanning process reaches the tip end of the broken parking area line K'). The parking frame setting portion 114 assigns the endpoint at the tip side of the negative edge of the parking area line K' as the start point (or finish point) of a sideline of the parking frame and assigns the endpoint at the tail side of the parking area line K as the finish point (or start point) of the sideline of the parking frame so as to register the positions (coordinate values) of the endpoints into the memory 120 as the parking frame registration data 121. The above process is also executed for the positive edge, which is adjacent to this negative edge and represents the other sideline of the parking frame. As a result, the four endpoints of the parking frame are appropriately corrected. This also applies to the following examples.

When the parking area line is not broken or interrupted by a shadow or the like as shown in FIG. 14B, the brightness difference between the adjacent pixels is less than the preset value. Therefore, the correction portion 116 determines that there is no broken parking area line to be connected with the subject parking area line K. The parking frame setting portion 114 registers the positions (coordinate values) of the start point and the finish point of the negative edge representing the subject parking area line K into the memory 120 as the start point and the finish point of the sideline of the parking frame (i.e., as parking frame registration data 121).

FIG. 15 and FIG. 16 show an example in which a part of the parking area line is shaded so that the parking area line is divided into two. In this example, the edges at the tip side may be discarded as noise or may be detected as the edges of another parking area line. In the example of FIG. 15 and FIG. 16, the correction portion 116 determines that the absolute value of the brightness difference between the adjacent pixels at the borderline of the shadow S and the road surface R is preset value or greater by scanning the image including the pixels offset from the negative edge line segment Em by the shadow search offset amount α for the shadow search length β.

In the example of FIG. 15, when the correction portion 116 scans the image in the X-axis positive direction from the position offset from the endpoint d by the offset amount γ for search start point, the correction portion 116 detects the positive edge and the negative edge having a length of the search success determination length δ or longer, thereby detecting the broken parking area line K'. In this case, the parking frame setting portion 114 registers the position (coordinate value) of the endpoint of the negative edge representing the broken parking area line K' and the position (coordinate value) of the endpoint of the negative edge representing the subject parking area line K into the memory 120 as the start point and the finish point of the sideline of the parking frame (i.e., as parking frame registration data 121).

In the example of FIG. 16, when the correction portion 116 scans the image in the X-axis positive direction from the position offset from the endpoint d by the offset amount γ for search start point, the correction portion 116 detects the positive edges and the negative edges. However, the lengths of the detected edges are less than the search success determination length δ. The correction portion 116 thus determines that no correction of the parking frame is required and determines that there is no broken parking area line. The parking frame setting portion 114 therefore registers the positions (coordinate values) of both endpoints of the negative edge representing the parking area line K into the memory 120 as the start point and the finish point of the sideline of the parking frame (i.e., as parking frame registration data 121).

As described above, the parking frame setting portion 114 registers the coordinate values (corrected coordinate values when corrected by the correction portion 116) of endpoints of the adjacent positive and negative edge line segments representing the parking frame 201 into the memory 120 as the parking frame registration data 121, and the vehicle control ECU 40 and the like can access the registration data 121. Here, the parking frame setting portion 114 may register the coordinate values of only two endpoints (start points) of the parking frame 201 close to the vehicle V so as to save the memory capacity of the memory 120 while defining the parking frame 201. However, the parking frame setting portion 114 may register all four endpoints (start points and finish points) of the parking frame 201 such that the image processor 100 is able to assist both forward parking and backward parking. Additionally, the information required for other automatic parking process, such as the angle or the direction of the parking area line 200 may also be added to the parking frame registration data 121 to execute the parking assistance process more appropriately.

The display control portion 115 sends a display control signal to the navigation device 30 so as to display the road surface images around the vehicle V captured by the cameras 20 or to display the parking frame image, which is set by the parking frame setting portion 114 and is corrected by the correction portion 116, with or without the road surface images on the monitor 31 of the navigation device 30.

The memory 120 includes a recording medium, for example, a large capacity recording medium such as a hard disk drive and a semiconductor recording medium such as a ROM and a RAM. Various data for use in various operations in the control portion 110 are temporarily or non-temporarily stored in the memory 120.

Similar to the first embodiment, the parking frame registration data 121 and the parameter data 122 are stored in the memory 120 of the second embodiment. The parameter data 122 includes, for example, the prescribed value for detecting an edge, the values α to δ used for determination of division of a parking area line and for detection of a broken parking area line, the reference length of the borderline such as the parking area line and the traveling lane, the parking space width, and their permissible errors. Furthermore, the memory 120 may store other parameters such as the width and angle of the borderline used by the image processor 100. Additionally, a plurality of parameters may be stored in the memory 120 and appropriate parameters may be selected in accordance with a shape and a size of a parking space (parking frame), a distance between traveling lanes, and a shape of a lane borderline in a country or a region where the parking assistance apparatus 1 is used.

An example of the operation executed by the image processor 100 of the second embodiment will be described with reference to FIG. 12 flowchart as well as FIG. 13A and FIG. 13B.

Figure 12:
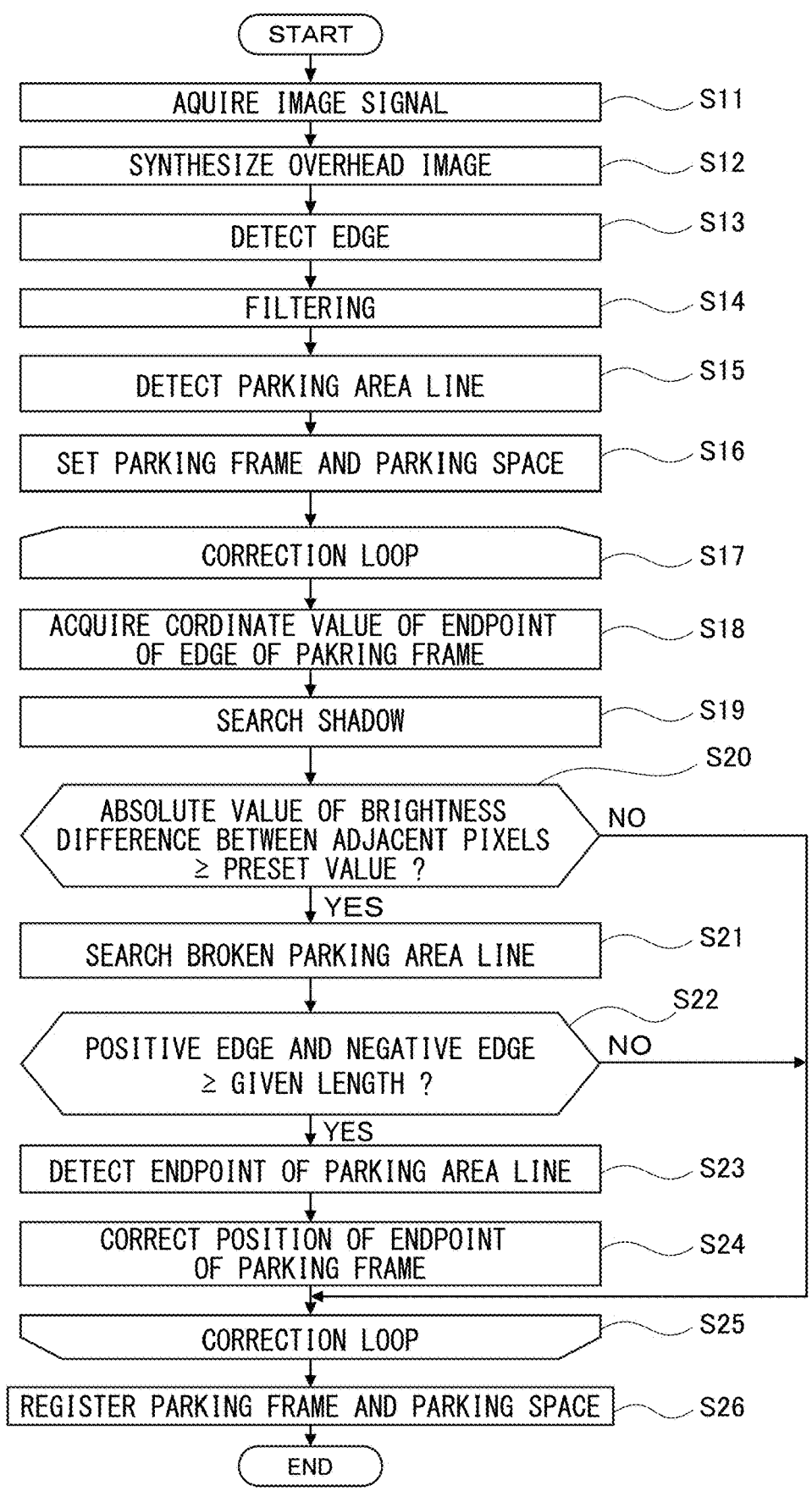
FIG. 12 is a flowchart for explaining an example of an operation of the image processor according to the second embodiment.

The operation shown in FIG. 12 starts in response to the input of the automatic parking start instruction by a driver's operation of the automatic parking start switch (not shown).

In Step S11, the control portion 110 of the image processor 100 acquires image signals from the images of the road surface R around the vehicle V captured by the cameras 20.

In Step S12, the control portion 110 generates a signal in which the image signals acquired in Step S11 are synthesized in accordance with the conventional technique. The image signal synthesized in Step S12 is for displaying an overlooked image (overhead image G of FIG. 13A and the like) as if taken by a camera disposed above the vehicle V on the navigation device 30.

It is also possible that the images are not synthesized in Step S12 or that the images are synthesized after detecting the positive edge and the negative edge in the next Step S13. However, it is preferable to detect the positive edge and the negative edge after generating the overhead image G since the processing load of the image processor 100 can be reduced.

In Step S13 (edge detection step), the edge detection portion 111 scans the overhead image G synthesized in Step S12 in the predetermined direction and detects the positive edge and the negative edge in the overhead image G based on the brightness values of the image signals, as described above.

In Step S14, the parking area line detection portion 113' filters the positive edges and the negative edges detected in Step S13 with the reference length, as described above. Through this process, short edges which are noise generated by light reflection on the road surface, garbage, dirt, and the like are discarded. It should be noted that the filtering process may be executed after the pair extraction process in Step S15. However, it is preferable to filter and discard the noise before the pair extraction so as to speed up the image process. In the example shown in FIG. 13A, the positive edge line segments Ep1-Ep8 and the negative edge line segments Em1-Em8 are detected.

In Step S15 (parking area line detection process or marker detection process), the parking area line detection portion 113' extracts a pair of the adjacent positive and negative edge line segments from the plurality of edge line segments detected in Step S14. To be specific, the parking area line detection portion 113' calculates the distance between the adjacent positive and negative edge line segments based on the overhead image G and determines that the adjacent positive and negative edge line segments constitute the pair representing the parking area line when the calculated distance is within a predetermined line width±permissible error.

In Step S16 (parking frame setting process), the parking frame setting portion 114 sets a parking frame and a parking space based on the pair of the edges representing the parking area lines determined in Step S14, as described above. The information (coordinate values) of the set parking frame is temporarily stored in the memory 120. In the example shown in FIG. 13A, the parking frame a1 is appropriately set and the parking frames a2, a3 are set in a distorted shape, as illustrated by imaginary lines.

Through the following correction loop process (correction step) in Steps S17 to S25, the correction portion 116 determines whether or not the parking area line is divided or interrupted by a shadow or the like, and corrects the positions of endpoints of the parking frame to the appropriate positions when it is determined that the parking area line is divided or interrupted. The process in Steps S17 to S25 terminates when it is determined that all the parking frames set in Step 16 have been processed.

In Step S18, the correction portion 116 acquires the position (coordinate value) of each of the endpoints of the adjacent positive and negative edge line segments which represent the parking area line of the subject parking frame. In Step S19, the correction portion 116 scans the image including the pixels offset from the endpoint of each edge line segment toward a preset direction side by the offset amount ($\alpha$), in the extending direction of the parking area line (i.e., edge) for a preset length ($\beta$).

In Step S20, the correction portion 116 determines whether or not the absolute value of the brightness difference between the adjacent pixels is a preset value or greater. When the determination in Step S20 is affirmative (YES), it is estimated that the parking area line is divided or interrupted by a shadow or the like and the program proceeds to Step S21.

When the determination in Step S20 is negative (NO), it is estimated that the parking area line is not divided or interrupted by a shadow or the like and the program skips the following Steps S21 to S24 and proceeds to Step S25.

In Step S21, the correction portion 116 scans the overhead image G for a given length ($\delta$) in the direction orthogonal to the parking area line (i.e., X-axis direction) from a position separated from the parking area line by the preset distance ($\gamma$) in the extending direction of the parking area line so as to search a broken parking area line.

In Step S22, it is determined whether or not positive and negative edge line segments with a given length ($\delta$) or longer are detected by the scanning process. When the determination in Step S22 is affirmative (YES), the correction portion 116 determines that a broken parking area line exists and the program proceeds to Step S22.

When the determination in Step S22 is negative (NO), the correction portion 116 determines that no broken parking area line exists. The program thus skips the following Steps S23, S24 and proceeds to Step S25 since there is no need to correct the positions of the endpoints of the parking frame.

In Step S23, the correction portion 116 continues the scanning process to detect the endpoints of the broken parking area line. In Step S24, the correction portion 116 corrects the position (coordinate value) of one endpoint of a sideline forming the parking frame, which is temporarily registered in the working area of the memory 120 in Step S16, to the position (coordinate value) of the endpoint of the edge representing the broken parking area line.

Here, it is possible to appropriately set the positions of the two start points of a parking frame appropriately by applying the process of Steps S18 to S24 at least to the start points of the adjacent positive and negative edge line segments representing the parking frame. However, it is preferable to apply the process of Steps S18 to S24 to both the start points and finish points of the positive and negative edge line segments to appropriately set the positions of the four endpoints (two start points and two finish points) of the parking frame.

In Step S25, it is determined whether there is another parking frame to be processed. When there is another parking frame, the program returns to Step S17 to execute the process on the parking frame. When there is no other parking frame to be processed, the program terminates the loop process and proceeds to Step S26.

In Step S26, the parking frame setting portion 114 registers the positions (coordinate values) of the endpoints (two start points or four endpoints) of each parking frame, which are temporarily registered in the working area of the memory 120, into the memory 120 as the parking frame registration data 121. Here, the positions of the endpoints of each parking frame have been corrected appropriately through the correction process in Steps S18 to S25. In the example shown in FIG. 13A, the positions of the endpoints of the parking frames a2, a3, which are set with a shape different from the actual shape, are appropriately corrected, such that the shapes of the parking frames a2, a3 are set to a rectangular shape, as shown in FIG. 13B.

The parking frame registration data 121 registered in the memory 120 is then sent to the vehicle control ECU 40 to assist the parking of the vehicle V.

With the image processor 100 according to the second embodiment as configured above, the control portion 110 detects a parking area line as a marker on the road surface R from the image based on the image signals acquired by the imaging device (cameras 20) that captures images around the vehicle V. When the detected marker is divided into a plurality of markers, the control portion 110 connects the plurality of markers to create a single marker.

To be specific, the parking area line detection portion 113' (marker detection portion) of the control portion 110 detects a parking area line (marker) from the overhead image G based on the image signals acquired by the imaging device 20 that captures the image around the vehicle V. The correction portion 116 determines whether or not a continuous parking area line to be connected is present on the extension line of the parking area line from a position separated by the preset distance (offset amount $\gamma$ for search start point). When a continuous parking area line is detected, the correction portion 116 connects the subject parking area line (K) and the detected continuous parking area line (K') to create a single parking area line. Additionally, the parking frame setting portion 114 of the second embodiment sets a parking frame in accordance with the connected single parking area line.

With the conventional image processor, it is difficult to accurately detect a parking area line due to a relatively large shadow of the subject vehicle, another vehicle, a wall, a fence, etc., and/or shadows of leaves of trees, and/or reflection of light by road lighting, etc., and/or a blur, and/or an obstacle. In particular, the brightness and the brightness difference of a parking area line are different between an area with shade and an area without shade, thereby it is difficult to properly detect the edge of the parking area line with shade. As a result, a part of the parking area line may not be detected, or the detected parking area line may be broken or interrupted. Also, an endpoint may be detected at a different position.

On the other hand, the image processor 100 according to the second embodiment is capable of correcting the endpoint of the parking frame to the position closer to the true values even when the parking area line is not detected or falsely detected and the endpoint of the parking frame is thus not properly set due to a shadow, light reflection, an obstacle, a blur of the line, lens distortion, and the like. Accordingly, it is possible to provide the image processor 100 and the image processing method capable of detecting a parking frame with high accuracy. Additionally, with the image processor 100 or the image processing method, it is possible to provide a parking assistance apparatus and a parking assistance method capable of realizing parking assistance with high accuracy.

In the second embodiment, the image processor 100 includes the edge detection portion 111 that scans the overhead image G in the predetermined direction to detect a pixel at which the brightness value changes more than the prescribed value and detects a portion in which the detected pixel array has the predetermined length or more as an edge. The parking area line detection portion 113' detects a parking area line based on the plurality of edges detected by the edge detection portion 111. With this, the calculation speed increases, thereby it is possible to detect the parking area line with high accuracy and high speed.

The correction portion 116 calculates the brightness difference between the adjacent pixels from the endpoint of the parking area line detected by the parking area line detection portion 113 along the extending direction of the parking area line. When the absolute value of the calculated brightness difference is the preset value or greater, the correction portion 116 determines that the parking area line is broken. The correction portion 116 then scans the image in the direction orthogonal to the extending direction of the parking area line from the position separated from the parking area line by the preset distance (offset amount γ for search start point) to determine whether or not a continuous parking area line to be connected with the subject parking area line is present on the extension line of the parking area line. With this, it is possible to efficiently determine whether or not a continuous parking area line exists. Further, it is possible to correct the endpoint of the parking frame to be closer to the true value, thereby improving the detection accuracy of the parking frame.

The preset value for the brightness difference used by the correction portion 116 is preferably smaller than the prescribed value for the brightness difference used by the edge detection portion 111. With this, it is possible to appropriately detect a presence of a shadow or the like and to accurately detect an edge of a shaded parking area line. Therefore, it is possible to detect a parking frame with high accuracy.

Here, the preset distance (offset amount γ for search start point) in the extending direction of the parking area line used to detect a continuous parking area line preferably has the length of 6% or less of the parking area line. Additionally, the given length (search success determination length δ) for the continuous parking area line preferably has the length of 3% or less of the parking area line. That is, it is possible to correct the position of the endpoint of the parking frame with the conventional image process when a positional error of the endpoint is within the acceptable range, and it is possible to correct the position of the endpoint by the correction portion 116 when the error exceeds the acceptable range.

Although the embodiments of this disclosure have been described with reference to the accompanying drawings, it should not be limited thereto. It should be appreciated that variations or modifications may be made in the embodiments described by persons skilled in the art without departing from the scope of the present invention as defined by the following claims.

For example, the image processor 100 of the above embodiments detects an edge based on a change degree and a change direction (positive direction and negative direction) of the brightness or the color parameter (e.g., RGB, RGBA, or the like) of pixels. However, the image processor 100 may detect an edge based on a change degree and a change direction of other information contained in the image signals.

In the image processor 100 of the second embodiment, the correction portion 116 corrects the positions of the endpoints of the parking frame after the parking frame setting portion 114 sets the parking frame based on the parking area lines detected by the parking area line detection portion 113'. The correction portion 116 then connects the broken parking frame area line to create the single parking area line, and the parking frame setting portion 114 registers the parking frame with the created single parking area line. However, the correction portion 116 may correct the position of the endpoint of the parking area line after the parking area line detection portion 113' detects the parking area line, and the parking frame setting portion 114 may set the parking frame based on the corrected parking area lines. It is possible to appropriately set the position of the endpoint with this configuration too.

What is claimed is:

1. An image processor comprising:
a control portion configured to detect a marker drawn on a road surface from an image captured by an imaging device that captures the road surface around a vehicle, wherein the control portion connects a plurality of broken markers to create a single marker when the detected marker is broken into plural, wherein
the control portion comprises:
an edge detection portion configured to scan the captured image in a predetermined direction to detect a plurality of edges;
an edge connection portion configured to detect a closest edge which is closest to a subject edge selected from the plurality of edges and that connects the subject edge and the closest edge to create a single edge when a distance between endpoints of the subject edge and the closest edge is predetermined interval or shorter; and
a marker detection portion configured to detect the marker based on the plurality of edges,
wherein the edge connection portion is configured to, when each of a distance from a line, which is formed by extending the subject edge, to a start point of the closest edge and a distance from the line, which is formed by extending the subject edge, to an end point of the closest edge is a threshold or below, to connect the subject edge and the closest edge.

2. The image processor according to claim 1, wherein the edge detection portion scans an area between the endpoints of the subject edge and the closest edge in a direction in which the subject edge extends and determines whether or not information related to the marker is present between the subject edge and the closest edge.

3. The image processor according to claim 1, wherein the edge connection portion counts a number of edges present within a predetermined range from the subject edge as an edge point, and the edge connection portion does not connect the subject edge with any of the plurality of edges when the counted edge point is a threshold number or greater.

4. The image processor according to claim 1, wherein
the edge connection portion assigns the endpoint of the subject edge, which is opposite to the endpoint of the subject edge close to the closest edge, as the coordinate of a start point of the single edge, and
when a distance between a straight line formed by extending the subject edge and an X-coordinate of the endpoint of the closest edge, which is opposite to the endpoint of the closest edge close to the subject edge, is a threshold value or shorter, the edge connection portion assigns a finish point of the closest edge as a coordinate of a finish point of the single edge,
whereas when the distance between the straight line and the X-coordinate of the endpoint of the closest edge, which is opposite to the endpoint of the closest edge close to the subject edge, exceeds the threshold value, the edge connection portion assigns an intersection of the straight line and a line extending perpendicularly from the X-coordinate of the endpoint of the closest edge, which is opposite to the endpoint of the closest edge close to the subject edge, to the straight line as the coordinate of the finish point of the single edge.

5. The image processor according to claim 1,
wherein the control portion comprises:
a marker detection portion configured to detect the marker from the captured image; and
a correction portion, wherein
the correction portion determines whether or not a further marker is detected on an extension line of the marker from a position separated from the marker by a preset distance, and
the correction portion connects the marker and the further marker to create the single marker when the further marker is detected.

6. The image processor according to claim 5, wherein the correction portion calculates a brightness difference between adjacent pixels from an endpoint of the marker detected by the marker detection portion along an extending direction of the maker and determines that the marker is broken when an absolute value of the calculated brightness difference is a preset value or greater, and
the correction portion determines whether or not the further marker is detected on the extension line of the marker from the position separated from the marker by the preset distance when it is determined that the maker is broken.

7. The image processor according to claim 6, wherein the preset value, which is used by the correction portion to determine whether or not the marker is broken, is smaller than a prescribed value, which is used by the marker detection portion to detect the marker.

8. The image processor according to claim 1, wherein the marker is a parking area line that defines a parking space, and
the image processor further comprises a parking frame setting portion that sets a parking frame based on the detected marker.

9. The image processor according to claim 1, wherein the marker is a lane borderline that divides a traveling lane, and
the image processor further comprises a traveling lane detection portion that detects the traveling lane based on the detected marker.

10. An image processing method, comprising:
detecting a marker drawn on a road surface from an image captured by an imaging device that captures the road surface around a vehicle; and
image-processing to connect a plurality of broken markers to create a single marker when the detected marker is broken into plural, wherein the image-processing comprises:
detecting a plurality of edges by scanning the captured image in a predetermined direction;
detecting a closest edge which is closest to a subject edge selected from the plurality of edges;
connecting the subject edge and the closest edge to create a single edge when a distance between endpoints of the subject edge and the closest edge is predetermined interval or shorter; and
detecting the marker based on the plurality of edges,
wherein, when each of a distance from a line, which is formed by extending the subject edge, to a start point of the closest edge and a distance from the line, which is formed by extending the subject edge, to an end point of the closest edge is a threshold or below, connecting the subject edge and the closest edge.

11. The image processing method according to claim 10, wherein the image-processing comprises:
detecting the marker from the captured image;
determining whether or not a further marker is detected on an extension line of the marker from a position separated from the marker by a preset distance; and
connecting the marker and the further marker to create the single marker when the further marker is detected.

* * * * *